United States Patent [19]
Mulchandani et al.

[11] Patent Number: 5,680,542
[45] Date of Patent: Oct. 21, 1997

[54] METHOD AND APPARATUS FOR SYNCHRONIZING DATA IN A HOST MEMORY WITH DATA IN TARGET MCU MEMORY

[75] Inventors: Deepak Mulchandani; Rand Gray, both of Austin, Tex.

[73] Assignee: Motorola, Inc., Schaumburg, Ill.

[21] Appl. No.: 485,332

[22] Filed: Jun. 7, 1995

[51] Int. Cl.$^6$ .................. G06F 11/00; G06F 12/00; G06F 15/20
[52] U.S. Cl. .............. 395/183.04; 395/500; 395/468; 395/471; 395/472; 395/473; 395/200.08; 395/200.19; 395/492; 395/704; 395/427
[58] Field of Search ..................... 395/500, 468, 395/471, 472, 473, 200.08, 200.19, 492, 427, 183.04, 704

[56] References Cited

U.S. PATENT DOCUMENTS 4,466,098  8/1984  Southard ..................... 395/182.1
5,155,824  10/1992  Edenfield et al. ............. 395/470
5,371,878  12/1994  Coker .......................... 395/500

*Primary Examiner*—Eddie P. Chan
*Assistant Examiner*—Vincent Yip
*Attorney, Agent, or Firm*—Bruce E. Hayden

[57] ABSTRACT

A copy of data in a Host Computer is synchronized with a version located in Shared Memory in a Modular Development System (MDS). Whenever a change in one or more bits in a Line of Data in Shared Memory are detected, a MDS Line Dirty Flag is checked. If the Flag is not set, it is set and a message is sent to the Host Computer that the Line of Data is now dirty. Whenever the Host Computer receives this message for a Line of Data in its visible memory, it sends a request to the MDS to read that Line from Shared Memory and send it to the Host. Otherwise, a Host Line Dirty Flag is set. The Host Computer also sends a request to read a Line of Data when that Line of Data is scrolled onto a screen and the corresponding Host Line Dirty Flag is set.

21 Claims, 11 Drawing Sheets

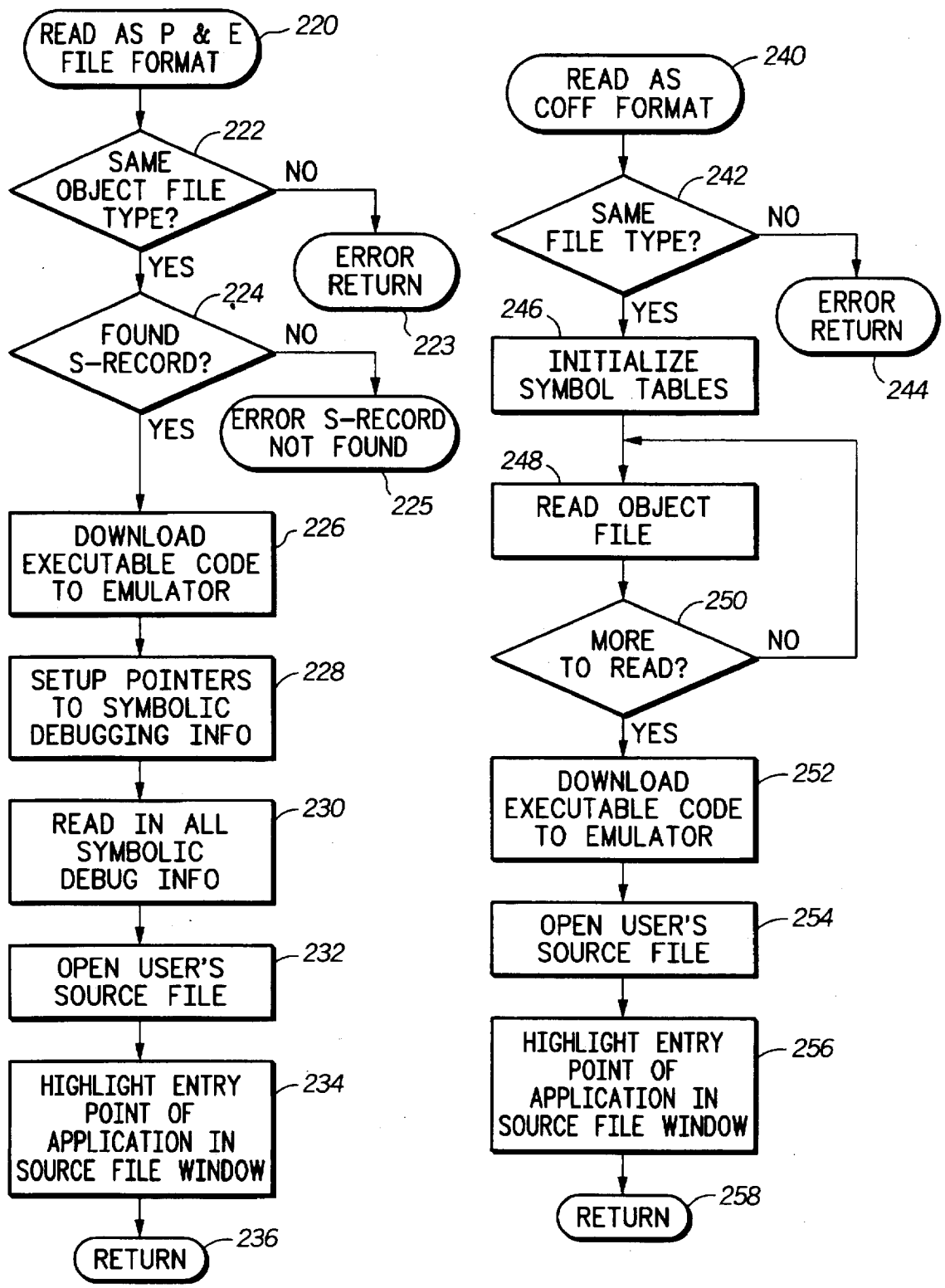

METHOD AND APPARATUS FOR SYNCHRONIZING DATA IN A HOST MEMORY WITH DATA IN TARGET MCU MEMORY

CROSS REFERENCE TO RELATED APPLICATION

This application is related to our copending patent application entitled METHOD AND APPARATUS FOR AUTOMATICALLY RECONFIGURING A HOST DEBUGGER BASED ON A TARGET MCU IDENTITY, application Ser. No. 08/485,330 filed on Jun. 7, 1995, of even date herewith and assigned to the assignee hereof.

This application is related to our copending patent application entitled METHOD AND APPARATUS FOR RESTORING A TARGET MCU DEBUG SESSION TO A PRIOR STATE, application Ser. No. 08/485,333, filed on Jun. 7, 1995, of even date herewith and assigned to the assignee hereof.

This application is related to our copending patent application entitled METHOD AND APPARATUS FOR DYNAMICALLY RECONFIGURING A PARSER, application Ser. No. 08/485,330, filed on Jun. 7, 1995, of even date herewith and assigned to the assignee hereof.

1. Field of the Invention

The present invention generally relates to circuit testing, and more specifically to providing an interactive embedded Microcontroller Unit (MCU).

2. Background of the Invention

When manufacturers of consumer products wish to modernize their end products (by adding features, reducing cost, by improving reliability, or simply accomplishing things that were not heretofore possible) they frequently will employ a microcontroller in their products. The microcontroller is said to be embedded in their products. In an embedded microcontroller, software developers will typically "embed" their programs, which usually means they are programmed into the ROM of the MCU. The product developers need a method to develop the software (or computer program) which will execute in the completed product. They will use a cross-compiler or cross-assembler to develop the code. In order to integrate, test, and debug that code, they need a debugger which is closely coupled to the cross compiler or cross assembler.

Due to shortening design cycle-time (time to market pressure), it is necessary for a debugger to make testing and debugging as productive as possible for a developer. Also, program development for "embedded" systems tends to be more tedious than for regular desktop computers since the constraints are different. This is due to the fact that "embedded" systems rely extensively on real-time operation which make interrupts and other external events very crucial to the correct operation of the system. Also, unlike desktop systems, the processor in an "embedded" system is just one portion of the overall system and is not the main processing unit. Lack of a console for debugging (no input/output support) also hinders developing applications because it denies developers the window they need into the state of their applications. This elevates the role that a debugger plays in the overall embedded application development cycle because a developer relies heavily upon his debugger to provide him with information regarding his application running in the microcontroller.

On mainstream development platforms such as UNIX™ or Microsoft Windows™ the development tools support is fairly sophisticated and mature. However for "embedded" applications, there tends to be a disconnect in the development tools between the cross compilers/assemblers and the debuggers. Also, all the project management utilities that the developer uses are not tied in closely with his development toolset. This often has a significant impact on a developer's cycle time because the toolset disconnect usually means that he has to relearn a new interface everytime he decides to make a change in his development methodology. Developers need a development environment which provide them with a familiar interface across all aspects of application development—coding, compiling, debugging and managing. This flees developers from having to go up the learning curve everytime they starts a new project.

Real time support currently provided by debuggers tends to be fairly immature. Commercially available "embedded" debuggers are not closely tied into the MCU that they support. This usually means that these debuggers do not cover all aspects of being a "real-time debugger" in that they cover half of the bases. A developer must not only be able to observe the execution of his application in real-time, but also be able to change parameters of his application, and be able to generate events in real-time in order to modify program flow-control. This functionality would give the developer a better feel for the execution of his application.

SUMMARY OF THE INVENTION

In accordance with the invention, a copy of data in a Host Computer is synchronized with a version located in Shared Memory in a Modular Development System (MDS). Whenever a change in one or more bits in a Line of Data in Shared Memory are detected, a MDS Line Dirty Flag is checked. If the Flag is not set, it is set and a message is sent to the Host Computer that the Line of Data is now dirty. Whenever the Host Computer receives this message for a Line of Data in its visible memory, it sends a request to the MDS to read that Line from Shared Memory and send it to the Host Computer. Otherwise, a Host Line Dirty Flag is set. The Host Computer also sends a request to read a Line of Data when that Line of Data is scrolled onto a screen and the corresponding Host Line Dirty Flag is set.

These and other features, and advantages, will be more clearly understood from the following detailed description taken in conjunction with the accompanying drawings. It is important to point out that there may be other embodiments of the present invention which are not specifically illustrated.

BRIEF DESCRIPTION OF THE DRAWINGS

FIG. 5 is a flow chart showing the operation of the test for P&E format module, in accordance with the present invention;

FIG. 6 is a flow chart showing the COFF Format Read procedure, in accordance with the present invention;

DETAILED DESCRIPTION OF A PREFERRED EMBODIMENT

Figure 1:
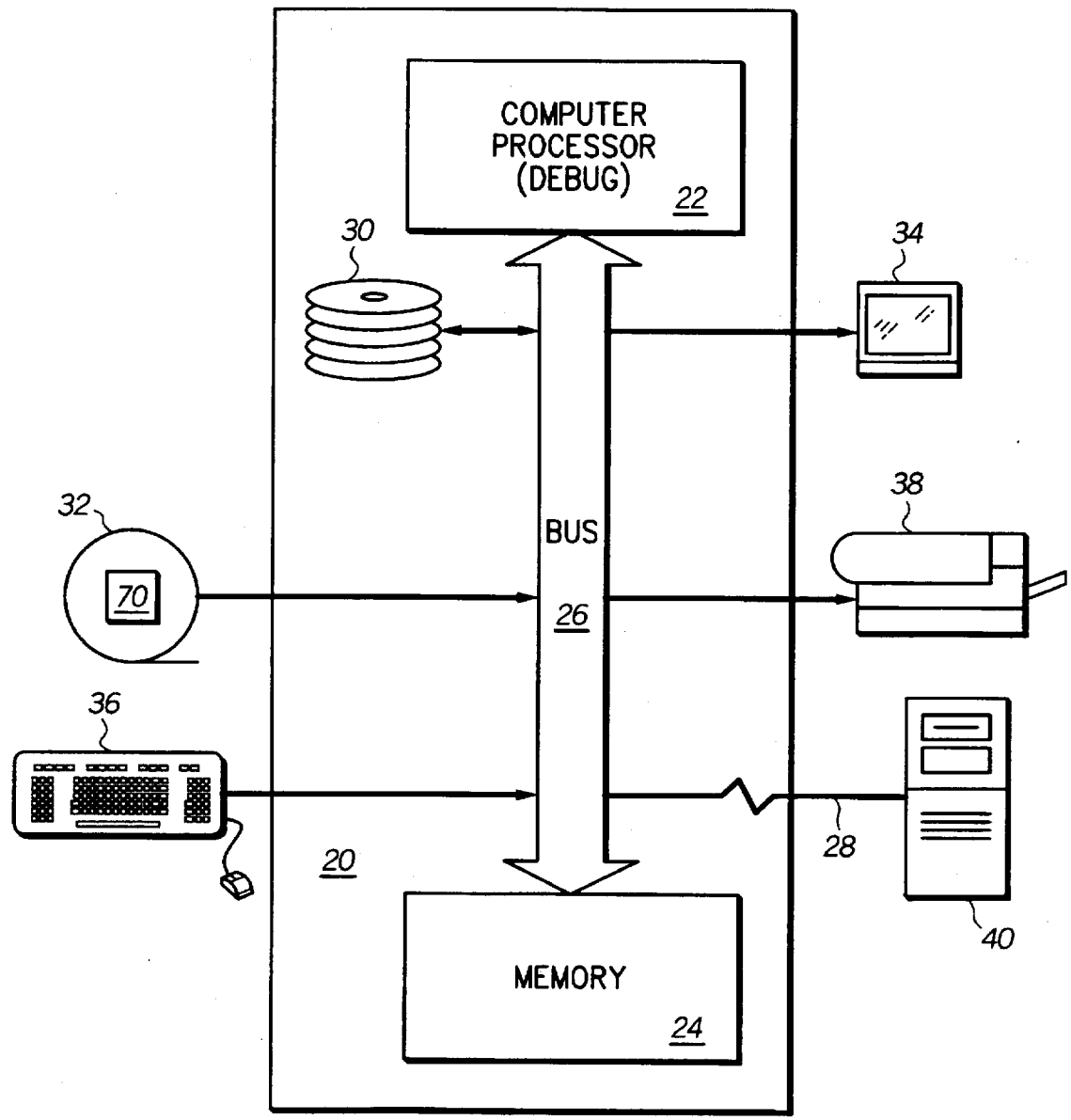
FIG. 1 is a block diagram showing the hardware components of the host portion of the MCUdebug system, in accordance with the present invention.

As embedded microcontroller units (MCUs) have become increasingly popular, the diversity in architectures available continues to grow in leaps and bounds. Unfortunately, until now, the sophistication of the development tools available for software development for these embedded microcontrollers has not kept pace. Highly integrated tools available on mainstream platforms such as Microsoft Visual C++™ for personal computers and SUN Microsystems SPARCworks™ for UNIX™ workstations offer users a productivity boost in application development. Until now, similar kinds of tools for embedded system development have not been available.

Integrated development environments provide users with the capability to design and develop their applications from within the same interface. Development environments allow the user to develop effective applications without having to climb up the learning curve on all the different tools that they use to build their applications. They also reduce the busy work that goes along with developing an application such as writing and updating a "makefile" and the constant switching that goes on between editors, compilers, and debuggers.

The MCUdebug software system is an application development and debugging environment for embedded microcontrollers. It allows users to edit, build, and debug their applications all within the same graphical user interface. It dynamically supports a variety of execution targets, including in-circuit emulators, evaluation systems and boards, and instruction set simulators.

MCUdebug allows the user to define the toolset they are using to develop their application. On building the application a makefile is automatically generated and the application is built (with any errors encountered displayed in an output window). MCUdebug is an integrated development environment that can be used to successfully develop embedded applications.

Developing applications for an embedded system poses many challenges compared to developing an application for a personal computer or a workstation. MCUs typically do not support an on-chip operating system to provide resource allocation support to applications. Therefore, application have no mechanism for memory management functions, input/output (disk, console window, ports), or other support functions. Multiple processes or tasks on an MCU can only be supported (to a limit) with the use of a real-time operating system. The following sections outline some other fundamental aspects of embedded software development.

Due to the lack of an operating system, applications must be developed on a different platform (such as a personal computer or a workstation), and then downloaded into the MCU memory for execution and debugging. For example, one could develop his application for a Motorola MC68HC08™ microcontroller using tools available for either Microsoft Windows™ or UNIX™. Using a debugger, the object code generated can then be downloaded into the target evaluation system for executing and debugging the application.

Since embedded MCUs do not support basic input/output, a console window is not available where a developer can observe the execution of his application. Also, no interaction can take place between an application and its developer during program execution. Normally, a debugger can be used to provide something close to a console, since it allows a user to observe the state of his application at any point. Debuggers also allow a user to perform traditional debugging operations like instruction tracing and programmed breakpoints.

Embedded MCUs tend to lack extensive on-chip memory resources such as RAM and ROM. This forces users to make decisions regarding memory usage and allocation (something the operating system linker/loader does automatically for a user). It also requires the development and availability of highly optimizing compilation tools which make very efficient use of the instruction set and the limited memory resources. Techniques such as overlays and allocation of data to either RAM or ROM as appropriate must be available.

MCUs are mostly used as a "processing element" in embedded systems. They are normally used as a portion of a larger, complex system. That means that they tend to perform an action as a result of a certain request. For example, an MCU might need to update a counter as a result of an interrupt. Since there is no guarantee as to when a request might be made, receiving and processing of asynchronous events tends to play an important role in embedded applications. Developers need to ensure that the time to process interrupts will not exceed the minimum period between interrupts in target systems, so that events are not lost.

Many toolsets are available for microcontroller development, but there is very little cohesiveness amongst them. For example, they do not support the same syntax for C or Assembly, do not generate the same object file formats, and do not provide the same functionality. Even error message formats differ between toolsets of different vendors. Lack of such standards causes problems in portability of applications among toolsets. That usually results in extra development effort to port applications between microcontrollers and toolsets, and usually causes a change in the performance of the application.

The previous section focused on some of the aspects of developing embedded applications. In the next section, we will take a closer look at some of the necessities for developing embedded applications.

There are certain attributes that every application being developed possesses. For example, there are source files, object files, and a toolset used to generate the project. All of these attributes can be grouped under the concept of a "project". Under traditional development conditions, a user is burdened with keeping track of the state of the object files with respect to the source files, and making consistent use of toolset options. A developer can define a project, and then make changes to it as development progresses.

In an integrated development environment, the environment takes care of keeping applications up to date: i.e., if a source file changes, it must flag the user to recompile it or if source files are added/deleted to a project, it must automatically regenerate a makefile. In this scenario, the only work developers must do is to add or delete source files, define their toolset used to build the application, and the rest of the work is taken care of by the development environment.

Bus State Analysis capabilities tend to be very important in embedded systems, since these capabilities allow a user the capability to track the exact flow of control through his application. These capabilities can be used without stopping program execution, and thus are particularly useful in real-time systems for which breakpointing would be inconvenient.

The success of an environment is very closely tied to its "look and feel" and how it allows the user to get the job done. An application might overpower its developer if information is not presented in a coherent manner. Applications must allow user customization so that users can customize their applications to make them look or operate like some other tool they might be familiar with.

Most integrated development environments are built around a single proprietary toolset. In the embedded systems development arena, there are generally a variety of cross assemblers and cross compilers available. Frequently users will become familiar with a particular toolset and will wish to standardize development around that toolset. It would be desirable to allow any favorite tool to be integrated into an integrated development environment.

In the next section, we shall show all the phases in the development of a simple embedded application. Applications normally follow the lifecycle of application design: writing the application, project definition/application generation and debugging/verification of program correctness. In this next section, we shall actually go through the various development cycles and point out important facts to look out for when developing embedded applications.

One example application is a modified version of the Paced Loop Framework program from Understanding Small Microcontrollers, by James M. Sibigtroth. The program is a general purpose software structure that can be used in a wide variety of MCU applications. Under control of the output compare interrupt timer of the Motorola MC68HC05™ MCU, the program polls various peripheral devices, servicing any that require service. The timing of the paced loop is designed to provide time to service during the time period of the loop, thus polling each device once each time through the loop. MCUdebug is used throughout the development of the application to demonstrate the features of the software. The program is included herein as the Appendix.

Even though the above described application contains only a single source file, project management is still helpful. Toolset definition occurs only once and thereafter makefile generation and application builds are automated. For example, a dialog window "Edit Window" allows a user to add/delete source files from the project. A "Toolset Options" dialog allows a user to setup options which are used to generate the makefile. The "Customize Assembler" dialog is an example of a dialog which a user can use to setup his application generation assembler.

For our example application, we only have one source file: "test05.asm", so we can add that to the new project using an "Edit Project" dialog. If assembled from the command line, the application would be generated as follows:

casm05 test05.asm 1 s d

To duplicate this command line within the MCUdebug environment, a user has to perform the following: in the "Customize Assembler" dialog, the "Assembler Executable" box should be set to "casm05," and "Assembler Options" box should be set to the string "1 s d". No further setup is required for this application (since it only requires an assembler). If the toolset contained a compiler, assembler, linker, and locator, a little more toolset setup is required.

If a user wishes to build an application, he can use the "build" command at the command line, or use a toolbar button "build", or he can use a project menubar option "build project". A "build" window will appear and the output will be displayed. If no error occurred while building the application, then the user can load the new object file and continue debugging (using the MCUdebug "load" command).

Execution control is essential to observe the flow of execution through a program. MCUdebug provides the user a wide variety of commands to support execution control. Commands such as "animate", "go", "gotil", "trace", and "step" are provided so a user can run his application, trace instructions, or execute his application until a specific section is reached.

The MCU reset vector is used extensively in embedded applications to return an application to a known starting state in case of abnormal program execution. It can also be used by a user externally while debugging to return his application to a known starting state. The MCUdebug command "reset" loads the MCU program counter ("pc") with the contents of the MCU reset vector, while the "resetgo" command will load the MCU program counter ("pc") with the contents of the reset vector and begin program execution.

For example, to run his application a user can use a "go" command. That starts execution of his application program, which runs until the user types a "stop" command. If the user wishes to execute his application until a certain address, he can use a "gotil" command (he must specify the ending address). If the user wishes to trace the execution of a single instruction, he can use a "t" command (an additional parameter <n> can be specified which allows them to trace <n> instructions). If the user wishes to return to the starting point of the application, he can use a "reset" command.

MCUdebug supports many different options for breakpoints. A "br" or "bp" command can be used to set a breakpoint, and the "nobr" or "bc" command can be used to delete a breakpoint. MCUdebug also supports conditional breakpoints which allow a user to enable (MCUdebug command "be"), or disable breakpoints (MCUdebug command "bd") during a session. Breakpoints, when used in conjunction with instruction execution commands, can be used to execute specific areas of the applications quickly.

Script, command, or log files allow a user to maintain a log of all the commands that he has executed during an MCUdebug session (command names "script" or "cf"). It also allows the user the capability to perform regression tests on his target embedded application. These scripts are ASCII files, so a user can copy or edit these files for reuse, as necessary.

Object files generated typically embed source line to memory address translations as debugging information. This allows debuggers such as MCUdebug to display a source window with a highlight line (the highlight line reflects the exact point in the source). Visual execution control allows a user a more abstract mechanism for controlling program execution. Instead of keeping track of explicit addresses in his application, he can control program execution using his actual source code.

Breakpoints and triggers also play a critical role in debugging applications. Breakpoints allow a user to halt program execution when a certain condition is satisfied, while triggers allow a user to view program execution after a certain condition has been satisfied. MCUdebug allows a user to set breakpoints and trigger terms using the mouse in his source window. If a developer wants to set a breakpoint in the source file, then he just needs to click on the left mouse button twice. To set a trigger term, he needs to click on the right mouse button twice.

To view Bus State Analyzer data, a user must first "arm" the Bus State Analyzer. As a result of that arming, any subsequent "trace" or "go" commands will result in the Bus State Analyzer capturing cycles into the trace buffer. MCUdebug currently supports 3 different modes of viewing bus state analyzer data: "Mixed"—displays a cycle by cycle format, "Instructions"—the instructions are disassembled, "State"—Address and data information along with POD information is displayed. Table T-1 is an example of an "Instruction Mode" Bus State Analyzer display. The columns in Table T-1 are "Fr#" (Frame Number), "Adr." (Instruction Address), "Data"(normally opcode), "Label", "Code", and "Bus Cycle". MCUdebug supports a wide range of commands which allow a user to perform custom setup of the analyzer (MCUdebug commands "st", "sq"), define search patterns, and save the analyzer data to output files (MCUdebug command "lt").

TABLE T-1

| | | | Bus State Analyzer | | | |
|---|---|---|---|---|---|---|
| Fr# | Adr. | Data | | Label | Code | Bus Cycle |
| 4181 | 0123 | 0F | 0F | 01 MAIN: | BRCLR 7,$0F,127 | [00FF=23] |
| 4191 | 0156 | 03 | C0 | OCFCNT: DEC | OCFS | [00C0=02] |

TABLE T-1-continued

| | | | Bus State Analyzer | | | |
|---|---|---|---|---|---|---|
| Fr# | Adr. | Data | | Label | Code | Bus Cycle |
| 4196 | 0158 | 26 | 06 | | BNE ENDRTI | |
| 4199 | 0160 | B6 | 13 | ENDRTI: | LDA TSR | [0013=60] |
| 4202 | 0162 | B6 | 17 | | LDA OCRL | [0017=A2] |
| 4205 | 0164 | 80 | | UNUSED | RTI | |
| 4214 | 0123 | 0F | C1 | FD MAIN: | BRCLR 7,TIC,MAIN | [00C1=00] |
| 4219 | 0123 | 0F | C1 | FD MAIN: | BRCLR 7,TIC,MAIN | [00C1=00] |
| 4224 | 0123 | 0F | C1 | FD MAIN: | BRCLR 7,TIC,MAIN | [00C1=00] |

As discussed in the previous sections, there are features that an embedded application development environment should provide. MCUdebug has been designed with backward compatibility in mind, while providing an extension to previously available tools. Backward compatibility has been maintained in object file format support, command language (currently supports the full Motorola MMDS05/MMDS08 command set), and in some cases even the screens. The following section describes some of the features of the MCUdebug application development environment.

As described previously, the task of maintaining an project in an application is very beneficial. MCUdebug provides a user the capability to define a project, add/delete source files, customize their generation toolset, and build his applications from within the same interface. If desired using the MCUdebug script file generation capabilities, the user can define his project using the graphical interface, save his entire project configuration to an ASCII file, and then later retrieve it if his wish to re-use their settings for another project. This allows reuse of previous work and eliminates the hassle of regenerating "makefiles" for each development project. It also provides a user with a more user friendly environment for project management.

On a MDS development systems that support Bus State Analysis capabilities, MCUdebug provides a rich set of functions which can allow a user to view analyzer data in variety of ways. The Bus State Analyzer window displayed in Table 1 is an example of the "Instructions Only" view mode of the bus state analyzer data. In the right section of the window (under the label "Bus Cycle") the data displayed shows the actual bus cycle that occurred on the execution of that particular instruction.

MCUdebug currently supports the Avocet SYM, IEEE 695 (as defined by HP/MRI), COFF (as generated by the Motorola MCUasm™ assembler), and the P&E Microsystems MAP File Format. Support for all these object file formats is important since it allows the user a great diversity in the range of toolsets that can be supported under the MCUdebug development environment. MCUdebug supports both toolsets for the Motorola MC68HC05™ and MC68HC08™ microcontroller families, so if a user decides to migrate between these microcontrollers, he will still be able to develop applications using the MCUdebug environment.

If applications are being developed using two or more different toolsets, then sometimes the toolsets will generate different object file formats for each application. Keeping track of which application was generated using which application can be a cumbersome task, especially if applications are being development for the same microcontroller family. MCUdebug allows the user to load an object file for debugging without the user having to specify what the "type" of the object file format that they are loading. The object code format is identified and loaded by the "Autoloader" function. If the user tries to load an object file format that MCUdebug does not support, then an appropriate error message is provided. That provides the user with the relief of not keeping track of which object Me format each of their applications is generated with.

Options are important for controlling the specific toolset used for application generation. MCUdebug allows the user to specify the toolset options which they wish to generate their application with. For example, a user might want the compiler to generate code using the —O2 option. MCUdebug provides features so a user can setup their Compiler, Assembler, Linker and if available, a locator. While adding source files to the project MCUdebug automatically determines the type of the source file being added. Therefore, adding a "C" source file requires the user to define a "C compiler" and if assembly language source files are used then an assembler must be defined.

MCUdebug features extensive support for user customization of the graphical user interface. Features such as window layout, colors and toolbar buttons. This section describes some of the customization facilities available to the user through MCUdebug.

The MCUdebug toolbar provides a user a quick way to execute "most frequently used commands." As defined by the MCUdebug command language, any command which can be entered on the command line can also be executed through a menubar option. If a command has a dialog associated with it, then typing that command on the command line without any arguments will cause MCUdebug to bring up the associated dialog. MCUdebug allows a user to "program" toolbar buttons i.e., program the available buttons to execute user defined commands. User defined aliases are also allowed as toolbar buttons command.

FIG. 1 shows the hardware components of the host portion of the MCUdebug system. The Host Computer 20 has a Computer Processor 22 connected through a bus 26 to RAM and ROM Memory 24. Also connected to the bus 26 are a disk drive 30, auxiliary storage 32, monitor 34, keyboard 36, and printer 38. The current implementation of the MCUdebug system uses either an x86 based Host Computer 20 running the Windows™ operating system or a SUN Microsystems SPARC™ workstation running the UNIX™ operating system. However, any computer with preferably a graphical user interface may be used. The auxiliary storage 32 may be tape, diskette, CD-Roms, or even storage belonging to another computer located across a network.

Originally loaded from the auxiliary storage 32 into Memory 24 and disk 30 are the various portions of the MCUdebug system. Executing on the Computer Processor 22 in the Memory 24 are the host portions of the MCUdebug program 70. Finally, connected via a communications link 28 to the host computer 20 is the Modular Development System (MDS) 40. A nine (9) pin serial RS232 interface is used.

Figure 2:
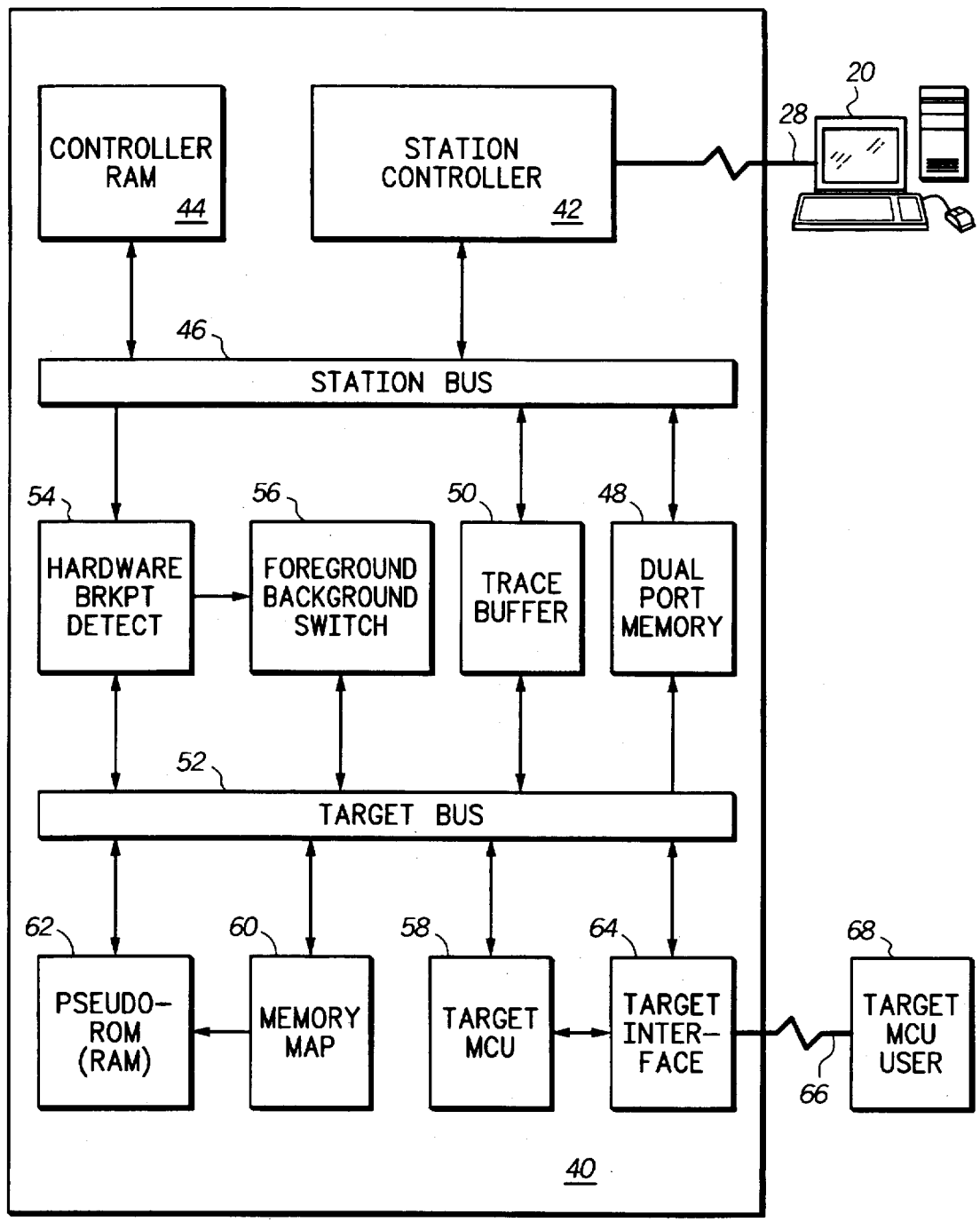
FIG. 2 is a block diagram showing the hardware components of the Modular Development System (MDS), in accordance with the invention.

FIG. 2 shows the hardware components of the Modular Development System (MDS) 40. The Modular Development System (MDS) 40 is connected via a communications link 28 to the Host Computer 20. The MDS 40 has two microcontrollers: a Station Controller 42, and a Target MCU 58. The Station Controller 42 operates as a debug monitor for the target MCU 58. In the MDS commercially available from assignee, a Motorola 68HC11™ processor is used for the Station Controller 42. The Motorola MDS is primarily used to test and debug Motorola 68HC05™ and 68HC08™ target MCUs. However, this invention will work with other Station Controllers 42 and Target MCUs 58.

Testing the execution of the target MCU 58 in turn is the primary purpose of the invention. It can be connected via another cable 66 to a Target MCU User 68. The cable 66 will usually connect to an IC carrier that replaces the actual Integrated Circuit (IC). For example, if the purpose of the Target MCU 58 is to time an automobile engine, then the cable 66 can be used to connect the Target MCU 58 to an actual engine. This provides the engineers optimizing engine performance the full debug capabilities available until now only for computer applications.

The Station Controller 42 MCU is connected to a station bus 46. Also connected to the station bus 46 are station controller RAM 44, Dual Ported Memory 48, a trace buffer 50, and a hardware breakpoint detect 54. The Dual Ported Memory 48 is shared with the Target MCU 58, providing a Shared Memory to the two microprocessors. This allows the Station Controller 42 to monitor a portion of the Target MCU's 58 memory activities and to change Target MCU 58 memory "on-the-fly". The Station Controller's 42 memory map includes the Dual Ported Memory 44, and the controller RAM 44. The Trace Buffer 50 is used to trace the execution of the Target MCU 58. Finally, the Hardware Breakpoint Detect 54 can be used by the Station Controller 42 to interrupt the Target MCU 58. Note that though the Hardware Breakpoint Detect 54 is shown connected to the station bus 46, it can also be connected directly to the Station Controller 42, as well as the Memory Mapper 60, and Trace Buffer 56. These three modules primarily use the Hardware Breakpoint Detect 54 module to interrupt the Target MCU 58.

The Target MCU 58 is connected to a target bus 52. Also connected to the target bus 52 are the Dual Ported Memory 48, Trace Buffer 50, Hardware Breakpoint Detect 54, foreground/background switch 56, memory map 60, pseudo-ROM 62, and a target interface 64. The target interface is connected by cable 66 to the target MCU user 68 such as the automobile engine described above.

The Target MCU 58 can operate in one of two modes controlled by the foreground/background switch 56. These two modes are similar to problem (or user) mode and supervisor mode on many computer processors. While in foreground mode, the Target MCU 58 executes the code being debugged. For example, the Target MCU 58 may be providing timing signals to an automobile engine. Switching to background operation gives control to a monitor program.

One of the primary methods of switching to background mode is through activation by the Hardware Breakpoint Detect 54 module. This module can be programmed, either by the Station Controller 42, or by the Target MCU 58 in background mode, to interrupt the Target MCU 58, causing it to enter a background mode interrupt routine. The Hardware Breakpoint Detect 54 module can be programmed to interrupt on certain memory accesses or execution of certain program instructions. Finally, it provides a convenient way for the Station Controller 42, Memory Map module 60, and Trace Buffer 50 to interrupt a Target MCU 58 operating in foreground mode.

The memory map for the Target MCU 58 is controlled by the Memory Map module 60. This module allows the Target MCU 58 in background mode to map the Dual Port Memory 48 and the pseudo-ROM 62 into the Target MCU's 58 memory space. Different executions of the target program may be mapped differently. For example, different portions of the Target MCU 58 memory space may be mapped into the Dual Port Memory 48 allowing monitoring and modification of these portions by the Station Controller 42, and thus by the MCUdebug program 70 running in the Host Computer 20. The Memory Map module 60 can be programmed to treat certain portions of the address map as readonly (ROM), other portions as read/write (RAM), and still other portions as non-existent. The Memory Map module 60 may be programmed to interrupt or ignore readonly writes and/or non-existent memory reads and/or writes. As noted above, interruption of the Target MCU 58 can be initiated with a signal to the Hardware Breakpoint Detect 54 module.

The Trace Buffer 50 or Bus State Analyzer traces or records everything on the Target Bus 52. Currently, the trace buffer 50 has 128 kb of RAM memory configured as 8192×16 byte frames. With current technology, for timing reasons, SRAM is preferable to using DRAM for the trace buffer 50. Each frame contains all of the relevant signals, including all bus and tag lines, for one bus cycle. Each frame uses 32 bits or 4 bytes for a time stamp and another 16 bits or two bytes can be used to record data from logic clips. When 8192 entries or frames have been inserted in the Trace Buffer 50, the tracing can either stop, or wrap. If the tracing is to stop, an interrupt may be raised to force the Target MCU 58 into background mode. The time stamp intervals may correspond to either asynchronous events, or to bus cycles.

The MCUdebug program 70 has a number of constituent parts. First, there is the generic debug program executing on the Host Computer 20. When a Station Controller 42 is initialized, it notifies the Host Computer 20. The Host Computer queries the Station Controller 42 for the type of the Station Controller 42 and type of Target MCU 58. After determining the type of Station Controller 42, the appropriate MCUdebug Station Controller routines are downloaded into the controller RAM 44.

Then when the host portion of the MCUdebug program 70 determines the type of Target MCU 60 installed in the MDS 40, the appropriate monitor and user program are read from disk 30, sent across communications line 28, and loaded into the Pseudo-ROM 62 and Dual Ported Memory 48. A corresponding memory map is loaded into the Memory Map module 60. The monitor is a set of Target MCU specific routines that are executed when the Target MCU 58 is in background mode.

Meanwhile, the host portion of the MCUdebug program 70 loads into host Memory 24 copies of the code and data downloaded to the Target MCU 58. The MCUdebug program 70 is dynamically reconfigured to correspond to the software and hardware loaded in the Target MCU memory 48, 62. This reconfiguration includes loading appropriate symbol tables and assembler mnemonic tables into Host Memory 24.

Dynamically loading and reconfiguring assembler mnemonic tables can be done utilizing the invention in our copending patent application entitled METHOD AND APPARATUS FOR DYNAMICALLY RECONFIGURING A PARSER, filed of even date herewith, assigned to the assignee hereof, and incorporated herein by reference.

Selection of which configuration and programs to download can be done either by creating a set of filenames based on the "Id" of the Target MCU 58, or by using the "Id" to index into a configuration file stored on disk 30. A similar mechanism can be used to select the portion of the MCUdebug program 70 to download into the station controller memory 44. However, this selection can be hard-coded if the number of selections is small and not expected to change quickly.

The interaction between the Host Computer 20 and the Station Controller 42 over interface 28 is via an internal protocol. This protocol allows the Host Computer 20 to send commands to the Station Controller 42 and receive back status responses. Many of the commands are directly equivalent to the line mode commands described hereinabove. The Station Controller 42 then either executes the commands directly, or interrupts the Target MCU 58 to execute the commands.

Normal operation of the Target MCU 58 after being loaded and initialized to a known state is to receive debug commands from the Host Computer 20 via the Station Controller 42. These commands are processed in background mode, and may set breakpoints, read and/or write memory, and registers, and the bus state analyzer or Trace Buffer 50. Ultimately a command to "run" is received. The Target MCU 58 then switches into foreground mode and executes the designated Target MCU code.

At some point the. Target MCU will "halt" and switch into background mode. This can be triggered by the Hardware Breakpoint Detect 54 encountering a breakpoint, an illegal memory access, or upon command of the Station Controller 42. The registers, including the program counter ("pc"), are sent to the Host Computer 20. These values are displayed on the screen 34 attached to the Host Computer 20. Uploading the program counter (pc) allows the MCUdebug program to highlight the pc location in the source code, and to display the surrounding code. The contents of the Trace Buffer 50 may also be uploaded in order to display the Bus State Analyzer contents.

Figure 3:
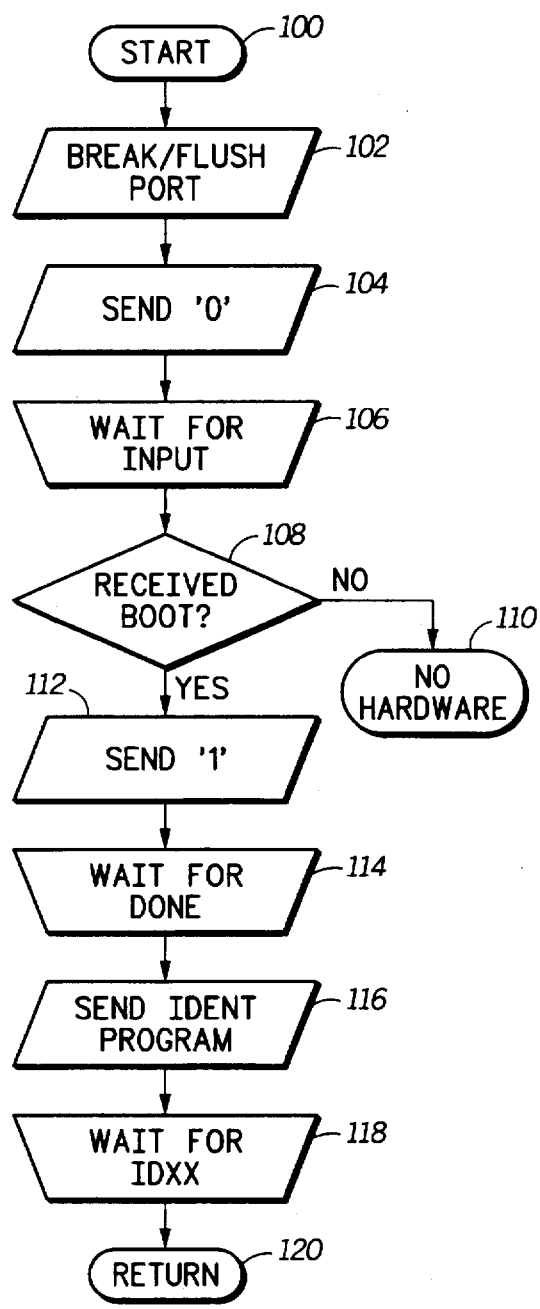
FIG. 3 is a flowchart showing how the host MCUdebug program determines the identity of the Target MCU, in accordance with the present invention.

FIG. 3 is a flowchart showing how the host MCUdebug program 70 determines the identity of the Target MCU 58. The program enters, step 100, and sends a break or flush port, step 102, across the communications line 28. Next, a zero character '0' is sent, step 104. The host program then waits for input, step 106. When the input arrives, it is validated as a boot command, step 108. If other than a boot command is detected, step 108, the program exits, indicating that no hardware is connected, step 110.

Otherwise, if a boot command was found, the single character one ("1") is sent, step 112, across the communications line 28. The host program then waits until the MDS 40 indicates that the "boot" command, step 114, has been accepted. At that point, an S-Record containing an Ident program is sent, step 116, to be run in the MDS 40. The Host program then waits for a response to the Ident program, step 118. Upon receipt of a Target MCU Id from the Ident program, step 118, the program exits, step 120, with the identity of the Target MCU 58.

Figure 4:
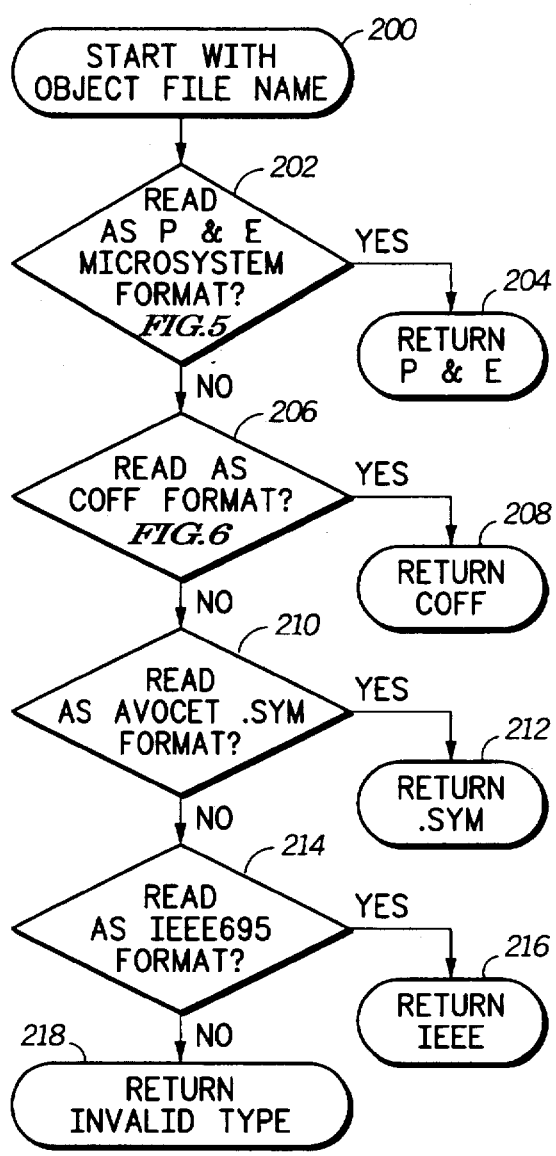
FIG. 4 is a flow chart showing the Autoloader function of the MCUdebug program, in accordance with the present invention.

FIG. 4 is a flow chart showing the Autoloader function of the MCUdebug program 70. This function is used once the identity of the Target MCU 58 has been determined (see FIG. 3) to select the proper routines to use to load the object code into host memory 24, and to download into the MDS 40. The Autoloader function selects the appropriate routines based on the object code format of the selected object code files.

The Autoloader function starts with an object file name, step 200. This can be the result of either manufacturing a filename based on Target MCU 58 Id (see FIG. 3 step 120), and/or from an entry in a configuration file. The object file is first read as if it were in P&E Microsystem format, step 202. If successful, the Autoloader returns indicating P&E format, step 204. Otherwise, an attempt is made to read the file as COFF format, step 206. If successful, the Autoloader returns indicating COFF format, step 208. Otherwise, an attempt is made to read the file as Avocet '.sym' format, step 210. If successful, the Autoloader returns indicating Avocet format, step 212. Otherwise, an attempt is made to read the file as IEEE695 formatted, step 214. If successful, the Autoloader returns indicating IEEE formatted object file, step 216. Otherwise, the Autoloader returns a status indicating an Invalid Type, step 218. Note that only one of the possible orderings of the above tests has been shown as an example.

FIG. 5 is a flow chart showing the operation of the test for P&E format module 202. The module enters, step 220, and checks whether it is the same object file type, step 222. If not, the module error returns, step 223. Otherwise, a check is made for an S-Record, step 224. If an S-Record is not found, step 224, the module error returns, step 225, indicating that no S-Record could be found. Otherwise, the executable code is downloaded to the emulator, step 226. Pointers to symbolic debugging information are setup, step 228. This is followed by reading the symbolic debugging information into memory, step 230. The user's source file is opened, step 232, the source code around the entry point is displayed in a window, the entry point is highlighted in that window, step, 234, and the module exits, step 236.

FIG. 6 is a flow chart showing the COFF Format Read procedure, step 206. The module is entered, step 240, and a check is made that the same object file type is being used, step 242. If not, the procedure error returns, step 244. Otherwise, the symbol tables are initialized, step 246, and the Object File is read, step 248. A check is made whether there is more to read, step 250, and if there is more to read, the procedure loops, reading the next object file, step 248. When there is no more to read, step 250, the executable code is downloaded to the emulator, step 252, the user's source file is opened, step 254, the source code around the entry point is displayed in a window, the entry point is highlighted in that window, step 256, and the module returns normally, step 258.

The modules to read Avocet ".sym" formatted files, step 210, and IEEE 695 formatted files, step 214, as well as routines for reading other object file formats, are similar to the procedures shown in FIG. 5 and FIG. 6. However, the states required by each different object file format differ. Note that most object code formats can be distinguished from each other by the format of the correspnding object file headers. For example, different "Magic Numbers" are found in the first bytes of many different types of object file formats.

Figure 7:
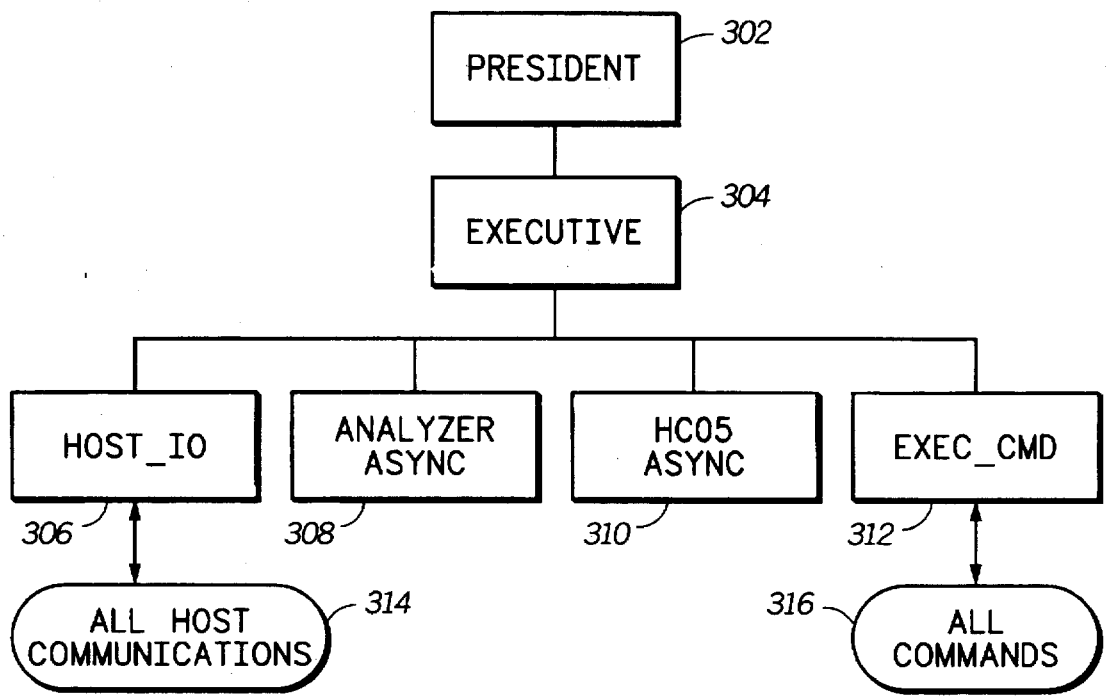
FIG. 7 is a program structure chart showing the relationship among the high level modules in the monitor program executed by the Station Controller, in accordance with the present invention.

FIG. 7 is a program structure chart showing the relationship among the high level modules in the monitor program executed by the Station Controller 42. The President module 302 includes the declarations and defines used thoughout the lower level modules. If C++ is used as the programming language, the President module 302 would include all data structures and attributes inherited by the lower level routines.

The Executive module 304 controls the lower level modules. One implementation utilizes a single repeating loop that can check for things to do, execute appropriate lower level routines, and then wait until an external event (including possible expiration of a timer) triggers it awake. The Executive 304 invokes the Host_IO module 306 to perform all host communications 314. The asynchronous analyzer module 308 controls the Bus State Analyzer or Trace Buffer 50 (see FIG. 2). The asynchronous HC05 module 310 controls and communicates with the Target MCU 58. Finally, the Exec_CMD routine 312 executes all host commands 316.

Figure 8:
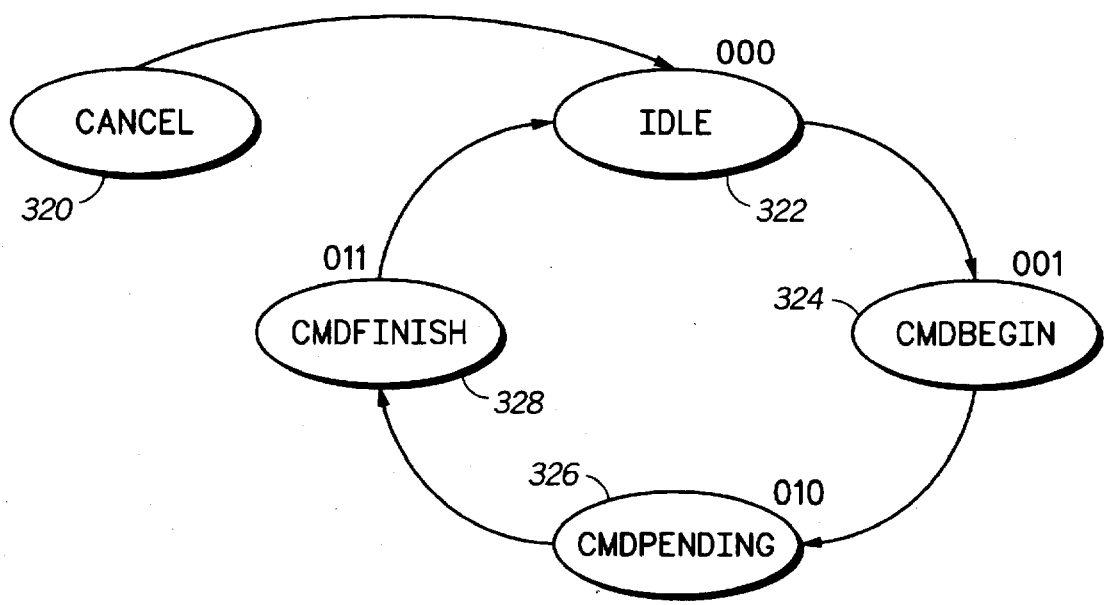
FIG. 8 is a state chart showing in accordance with the present invention the state transitions encountered by the Station Controller when executing commands.

FIG. 8 is a state chart showing the state transitions encountered by the Station Controller 42 when executing commands. The normal status is IDLE 322. When a command is received, the monitor program enters CMDBEGIN state 324. After the command is initiated, the monitor enters CMDPENDING state 326. It stays in this state until the command is complete, at which time it enters CMDFINISH state 328 to cleanup prior to reentering IDLE state 322. Note that regardless of state, a CANCEL 320 will force the monitor back to IDLE state 322.

Figure 9:
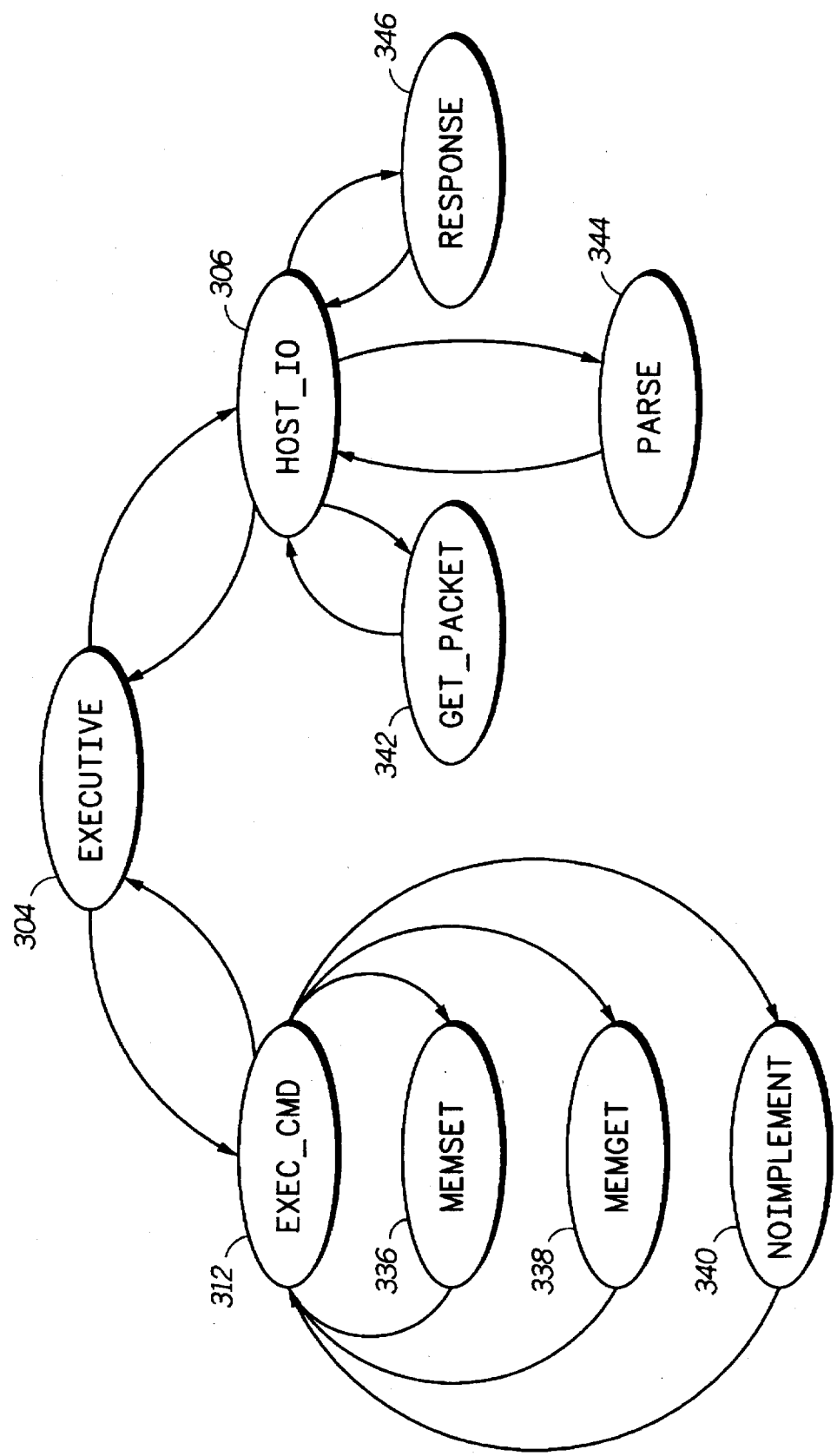
FIG. 9 is a procedure call diagram showing the operation of the Station Controller Executive module, in accordance with the present invention.

FIG. 9 is a procedure call diagram showing the operation of the Station Controller 42 Executive module 304. As noted above, the Executive module 34 loops looking for things to do. When the Executive module 34 receives a message from the host, the Host_IO module 306 is called. The Host_IO module calls GET_PACKET 342 to get the packets necessary to interpret a command received from the host. Then the Parse routine 344 is entered to parse the command. If the parse command was successful, a response, if necessary, is sent back to the host 346.

After a command has been parsed 344, it is executed when the Executive module 304 invokes the EXEC_CMD module 312. If the host command is to update Shared Memory, the MEMSET routine 336 is invoked. If the host command is to read Shared Memory, the MEMGET routine 338 is invoked, and the Shared Memory read is returned as a response 346. Otherwise, the NOIMPLEMENT module 340 is invoked to recover from unimplemented host commands.

Figure 10:
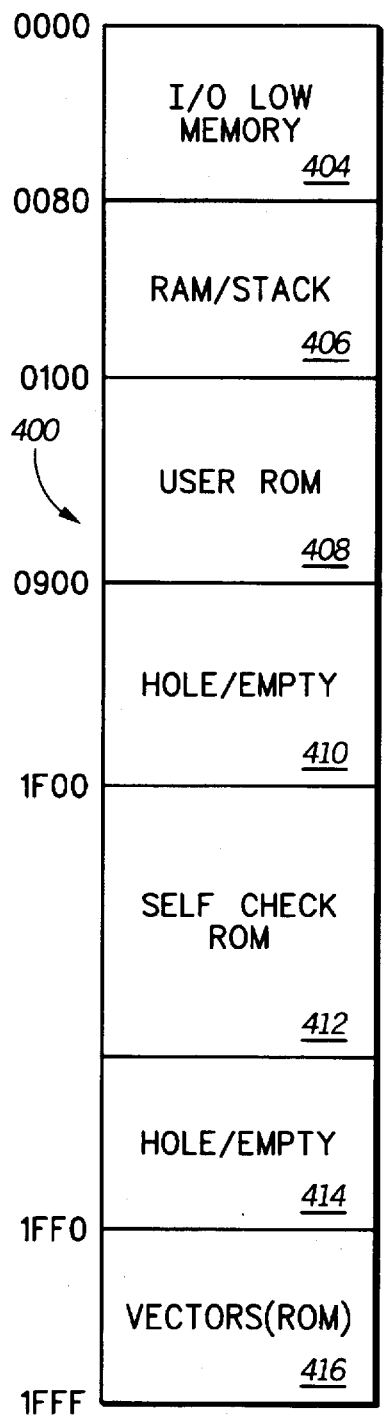
FIG. 10 shows a typical memory map of a Target MCUr.

FIG. 10 shows a typical memory map 400 of a Target MCU 58. The Memory Map module 60 (see FIG. 2) maps the Pseudo-ROM/RAM 62 and Dual Port Memory 48 into the Target MCU's 58 memory space.

The memory map usually has I/O low memory 404 at the bottom of the memory map 400. This is followed by a statck in RAM 406, user ROM 408 containing the user program, an empty hole 410, serf check ROM 412, possibly another hole 414, and interrupt vectors 416 in ROM. It should be noted there that the memory map shown is for illustrative purposes only. MCUdebug is not limited to this exact, or even similar memory mapings, but rather supports an unlimited number of different memory mapings.

Note that the Memory Map module 60 allows the Target MCU's 58 address space to be mapped to exactly correspond to the actual embedded memory of the Target MCU when fully implemented in silicon. The Pseudo ROM/RAM 62 and the Dual Port Memory 48 are implemented in the MDS as RAM. ROM and hole functionality are simulated by specifying in the memory map downloaded from the Host Computer 20 the actions taken by the Memory Map module 60 when reads and/or writes of readonly memory and holes are encountered. These illegal accesses can either be ignored, or the Target MCU 58 interrupted and placed in background mode by a signal from the Memory Map module 60 to the Breakpoint Detection module 54.

The Memory Map module 60 also is used to specify which memory addresses in the Target MCU 58 address space are visible to the Station Controller 42. This feature is used to allow the Station Controller 42 to monitor the shared portion of the Target MCU's 58 memory for changes and to make changes in the Target MCU's 58 memory in real-time. Different portions of the Target MCU address space may be monitored and modified on different executions of the Target MCU program by simply loading different memory maps into the Memory Map module 60.

Figure 11:
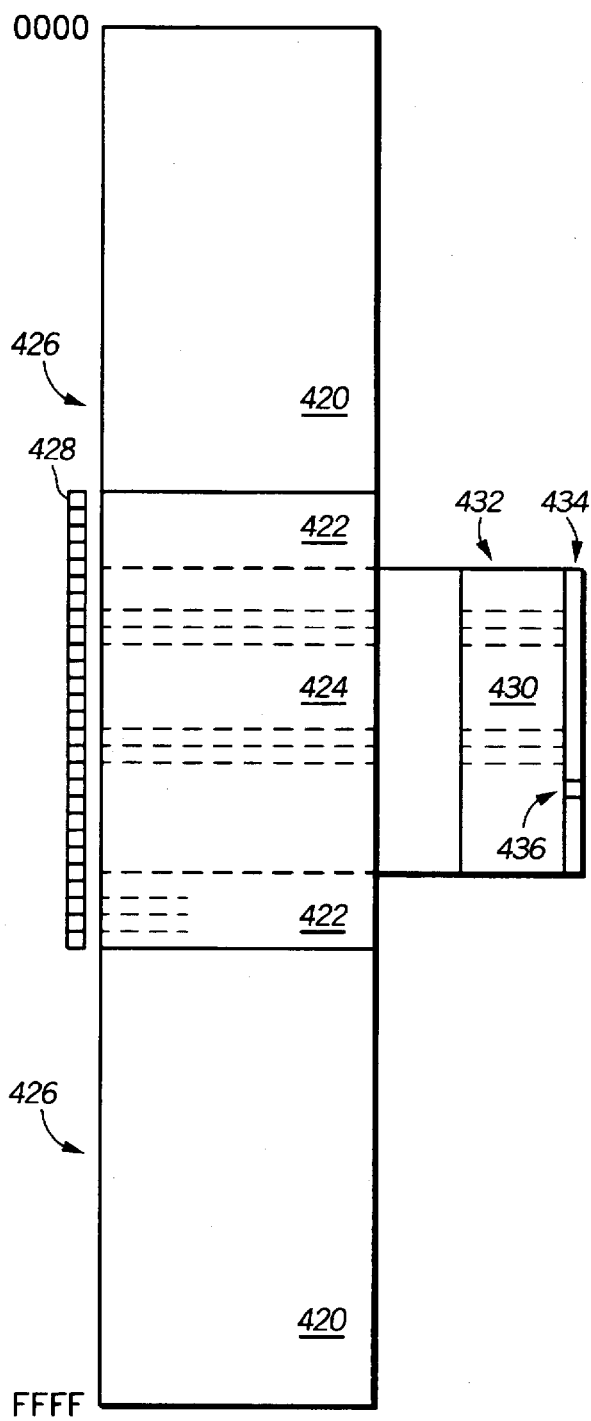
FIG. 11 is a block diagram showing the interaction between the Target MCU memory and a real time display of the memory on the Host Computer, in accordance with the present invention.

FIG. 11 is a block diagram showing the interaction between the Target MCU 58 memory and a real time display of the memory on the Host Computer 20. The address space 426 of the Target MCU 58 includes shared 422, 424, and nonshared areas 420. Typically, the shared portions of memory ("Shared Memory"), 422, 424, are mapped by the Memory Map module 60 into the Dual Ported Memory 48, while the "Nonshared Memory" areas 420, are mapped into the Pseudo-ROM 62 memory. The reason for sharing the memory is two-fold: it allows the Station Controller 42 to monitor Shared Memory for changes made by the Target MCU 58, and it allows the Station Controller 42 to update or modify the Shared Memory in real-time. As noted above, different portions of the Target MCU 58 address space can be mapped into the shared Dual Port Memory 48 at different times by loading different memory maps into the Memory Map module 60.

At a minimum, the Shared Memory is shadowed in the Host memory 24. This allows the MCUdebug program 70 executing on the Host Computer 20 to display the current status of the Target MCU 58 memory at all times. It can also be shadowed in the Station Controller RAM 44 in order for the Station Controller 42 to detect changes in the Shared Memory.

A portion of the Target MCU 58 memory is displayed by the MCUdebug program 70 in a window 432 on the display 34 attached to the Host Computer 20. The window 432 display includes a number of Lines of Text 430 and a scroll bar 434. The scroll bar 434 has a standard scroll button 436 used to scroll up and down. The number of Lines of Text 430 displayed at any time can be dynamically modified by resizing the window 432. The Lines of Text can be displayed in the window 432 in Hex, Octal, ASCII, and/or instruction format. The Lines of Text displayed 430 correspond to the visible portion ("Visible Memory") 424 of the Shared Memory. The remainder of the Shared Memory is temporary invisible ("Invisible Memory") 422. There is an array of Dirty Flags 428 in the Station Controller RAM 44, and another similar array of Dirty Flags located in the Host Computer memory 24. There is one Dirty Flag 228 in each computer for each Line of Text in the Shared Memory. The Lines of Text are each an arbitrary fixed length. In one implementation, each Line of Text is 8 bytes long.

The MCUdebug program 70 allows an engineer to view the contents of the Target MCU 58 memory in real-time. This means that any changes that the Target MCU 58 makes to the Shared Memory are immediately reflected in the window 432 if the memory changed is in the Visible Memory 424. The display of the Invisible Memory 422 is postponed until the Window 432 is scrolled 436, causing the Invisible Memory 422 to become visible.

The MCUdebug program 70 also allows an engineer to modify the display of Target MCU 58 memory displayed in a window 432 on his monitor 34. He just has to "point and click". Changes to the memory are performed by the Station Controller 42 in real-time, without requiring a Target MCU 58 to stop and interrupt what it is doing. Thus, automotive engineers can tweak timing parameters without having to start and stop an engine being timed by the Target MCU 58. This real-time display and modification of the Target MCU 58 memory provides substantial improvements in MCU testing for users of the MCUdebug system.

FIG. 12 through FIG. 18 are flow charts showing the interaction between the Host Computer 20 and the Station Controller 42 in the MDS in maintaining the consistency of the two versions of the Shared Memory.

Figure 12:
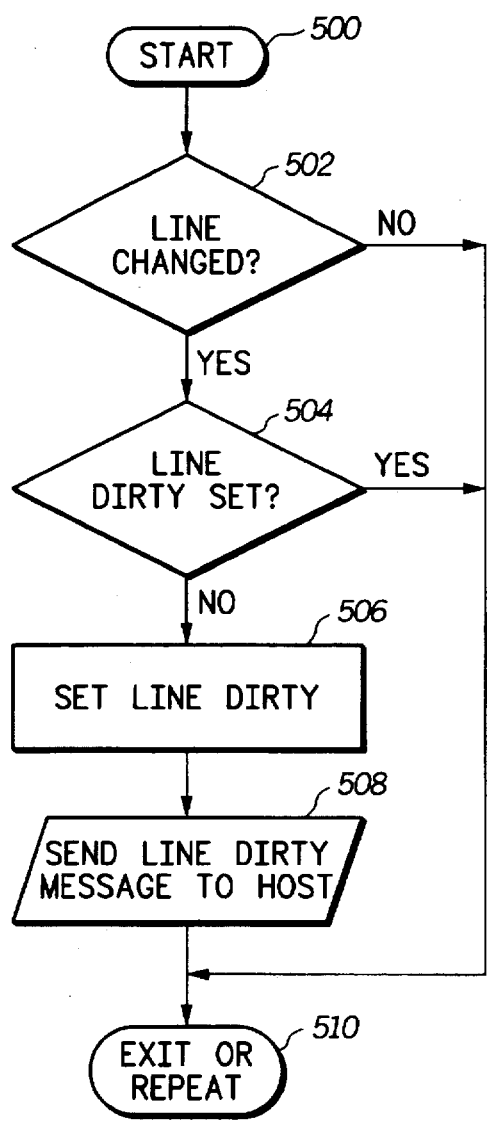
FIG. 12 is a flow chart that shows in accordance with the present invention part of the monitor activity of the Station Controller.

FIG. 12 is a flow chart showing part of the monitor activity of the Station Controller 42. One of the jobs of the Station Controller 42 is to detect changes in the memory shared via the Dual Ported Memory 48 with the Target MCU 58. One method of detecting changes is by keeping a copy of the Shared Memory in the station controller RAM 44. The Station Controller 42 would then periodically compare this copy with the actual Shared Memory. An alternative to this is to checksum each of the lines of Shared Memory, and then to compare the checksums to stored checksums. In either case, the comparisons should be done on a reasonably periodic basis. Since the primary purpose of the comparisons is to make sure the Lines of Text displayed in the window 430 are consistent with the corresponding contents of the Visible Memory 424 portion of the Shared Memory, criteria in determining the frequency of comparisons include the limits of human perceptions. A frequency of 3–5 times a second yields acceptable results.

In the flow chart in FIG. 12, the change routine is entered, step 500, and a check is made whether a given Line of Text in the Shared Memory has been changed, step 502. If the line has been changed, a check is made whether the line dirty flag 428 is set, step 504. If the Line Dirty Flag 428 for the changed line not set, it is set, step 506, and a message is sent to the Host Computer 20 that the given Line of Text is now dirty, step 508. Setting the Line Dirty Flag 428 for the Line of Text indicates that the Host Computer 20 has been notified of the change, but that it has not requested that its copy of the line be updated. In any case, the change routine will either return, check the next Line of Text, or restart the change routine with the first Line of Text, step 510, as appropriate.

Figure 13:
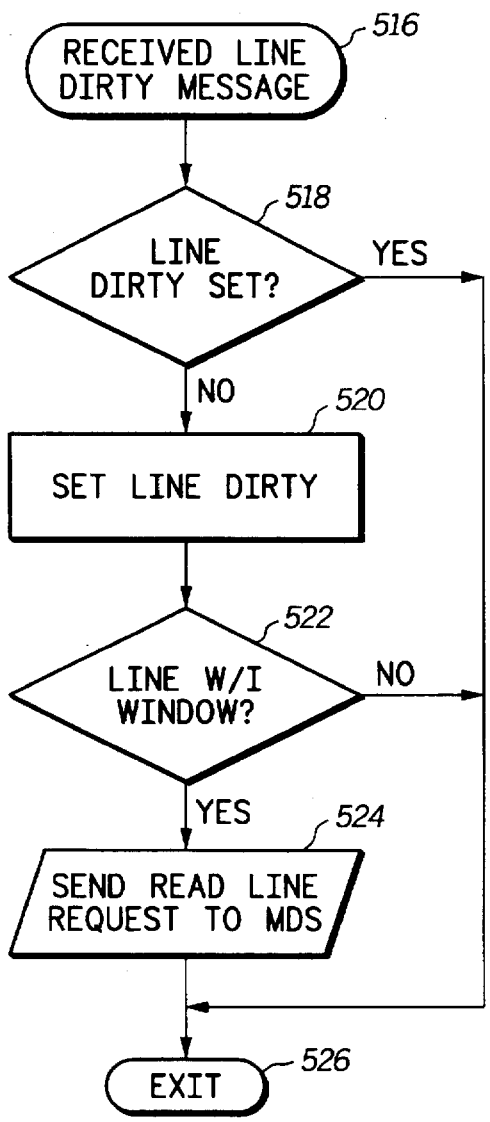
FIG. 13 is a flow chart that shows in accordance with the present invention the actions taken by the Host Computer when a Line Dirty message is received from the MDS, in accordance with the present invention.

FIG. 13 is a flow chart that shows the actions taken by the Host Computer 20 when a Line Dirty message is received from the MDS 40. As noted in FIG. 12, a Line Dirty message is sent by the Station Controller 42 when it first detects a change in the Shared Memory. The Received Line Dirty Message routine enters, step 516, and checks the corresponding Line Dirty Flag, step 518, in the Host Memory 24. If the Line Dirty Flag is not set, it is set, step 520. Next a check is made whether the corresponding Line of Text is within the displayed window, step 522. If the Line of Text is currently in the displayed window, a message is sent to the Station Controller 42 requesting that the Line of Text be read from the Shared Memory and sent, step 524, to the Host Computer 20. In any case, the routine then exits, step 526.

Figure 14:
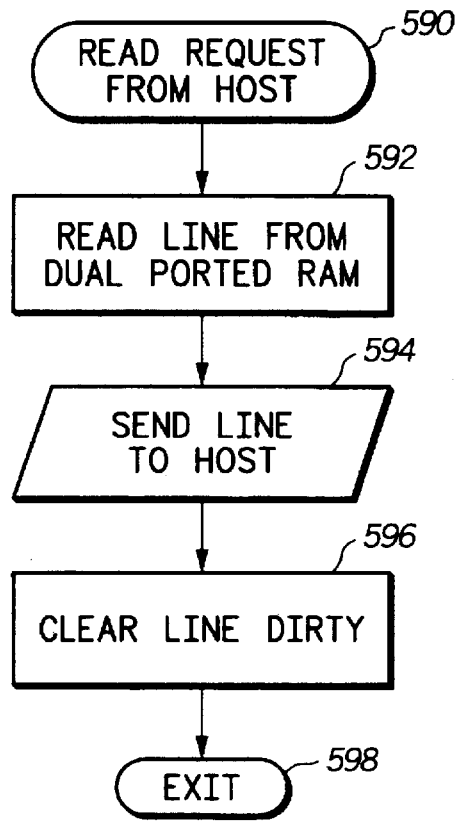
FIG. 14 is a flow chart that shows in accordance with the present invention the actions taken by the Station Controller when it receives a request that a specified Line of Text be read from Shared Memory and sent to the Host Computer.

FIG. 14 is a flow chart that shows the actions taken by the Station Controller 42 when it receives a request that a specified Line of Text be read from Shared Memory and sent to the Host Computer 20 (see FIG. 13 flowchart). After a read request is received from the Host Computer 20, the routine is entered, step 590. The corresponding line is read from the Dual Ported Memory 48, step 592, and is sent to the Host Computer 20, step 594. The corresponding Line Dirty flag is cleared, step 596, by the Station Controller 42, and the routine returns, step 598.

Figure 15:
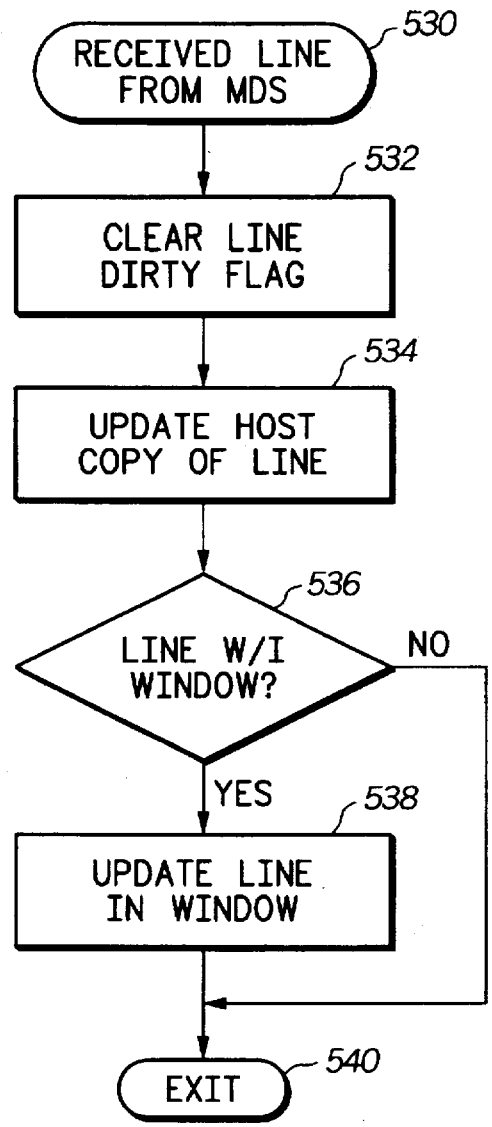
FIG. 15 is a flow chart that shows in accordance with the present invention the actions taken by the Host Computer when it receives a Line of Text from the MDS.

FIG. 15 is a flow chart that shows the actions taken by the Host Computer 20 when it receives a Line of Text from the MDS 40. This is usually in response to a request by the Host Computer 20 as was shown in FIG. 14. When the updated Line of Text is received, the Line of Text Received routine in the Host is entered, step 530. The corresponding Line Dirty Flag in the Host Memory 24 is cleared, step 532. The shadow copy of the Line of Text in the Host Memory 24 is updated to correspond to the newly received Line of Text, step 534. A check is then made whether the newly updated Line of Text is in the current window, step 536. This is a check whether the Line of Text just received is in the visible portion 422 (see FIG. 11), or Invisible Memory portion 424 of the Shared Memory. If the Line of Text is in the currently displayed window, the corresponding line on the monitor 34 is updated, step 538. In any case, the routine then exits, step 540.

Figures 16, 17:
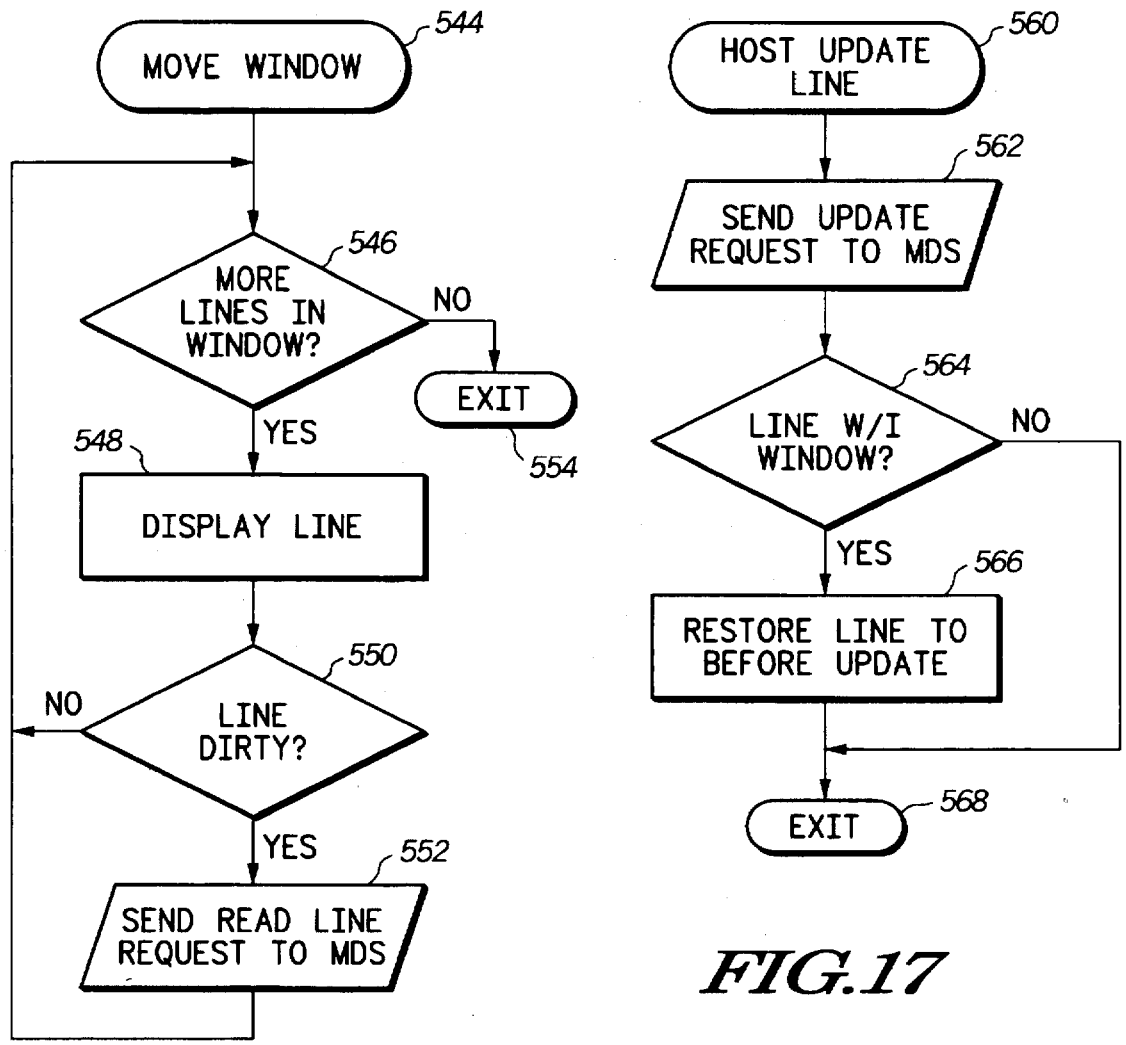
FIG. 16 is a flow chart that shows in accordance with the present invention the actions taken by the Host Computer when the MCUdebug operator scrolls the Window by moving the scroll button in the scroll bar.
FIG. 17 is a flow chart in accordance with the present invention showing the actions of the Host Computer taken to synchronize versions when updating the Shared Memory.

FIG. 16 is a flow chart that shows the actions taken by the Host Computer 20 when the MCUdebug operator scrolls the Window 432 (see FIG. 11) by moving the scroll button 436 in the scroll bar 434. The Move Window routine is entered, step 544, and a check is made whether more new Lines of Text are currently in the Window 432, step 546 (i.e. the Lines of Text are in Visible Memory 424). When no more new Lines of Text are in the window 430, the routine exits, step 554, until the screen is again scrolled. Otherwise, the appropriate Line of Text 430 in the Window 432 is updated to display, step 548, the corresponding shadow copy of the Shared Memory stored in the Host Memory 24. Next, the Line Dirty flag is checked for the Line of Text, step 550. If the Line Dirty flag is set, a request is sent to the Station Controller 42 to read the Line of Text from the Shared Memory, step 552. In any case, this is repeated until there are no more new lines in the Window 432. Note here that the shadow copy of Shared Memory is only updated in the Host Memory 24 when scrolling the Window 432 makes the Shared Memory visible 424.

FIG. 17 is a flow chart showing the actions of the Host Computer 20 taken to synchronize versions when updating the Shared Memory. This can be triggered by the MCUdebug operator pointing at a location in the memory window 430 and typing in new values, or through batch commands. In either case, the Host Update Line routine is entered, step 560. An Write or Update Request is sent to the Station Controller 42 with the new values for the Line of Text to be modified, step 562. A check is then made whether the Line of Text is currently visible 424 in the Window 430, step 564. If visible, the Line of Text in the Window 430 is updated from the shadow version stored in the Host Memory 24. By restoring the Line of Text in the Window 430 to its pre-modified state, MCUdebug guarantees that the display is consistent with the actual contents of the Shared Memory. In any case, the routine then exits, step 568.

Figure 18:
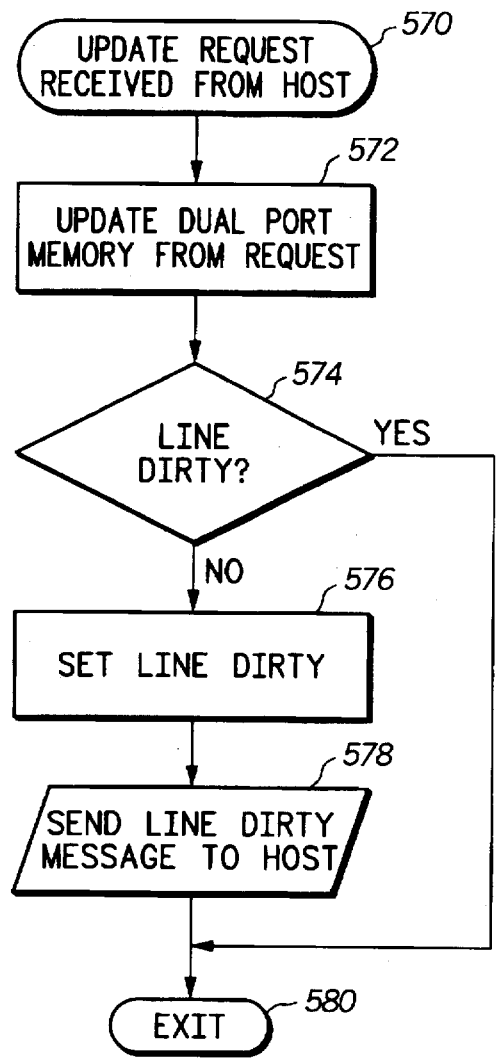
FIG. 18 is a flow chart showing in accordance with the present invention the actions taken by the Station Controller when receiving a Write or Update Command from the Host Computer.

FIG. 18 is a flow chart showing the actions taken by the Station Controller 42 when receiving a Write or Update command from the Host Computer 20. This command is usually generated as in FIG. 17 through commands by the MCUdebug operator to Write or Update Shared Memory. The routine is entered, step 570, and the Dual Ported Memory 48 is written to correspond to the Write command, step 572. The corresponding Line Dirty flag 428 is then checked, step 574. If the Line Dirty flag 428 is not set, it is set, step 576, and a Line Dirty message is then sent to the Host Computer 20, step 578. Note that upon receipt of this message, the Host Computer would then request that the line be Read from Shared Memory and returned, if the Line of Text is currently in the visible portion of Shared Memory 424 (see FIG. 13 flowchart). Finally, the routine returns, step 580.

Figure 19:
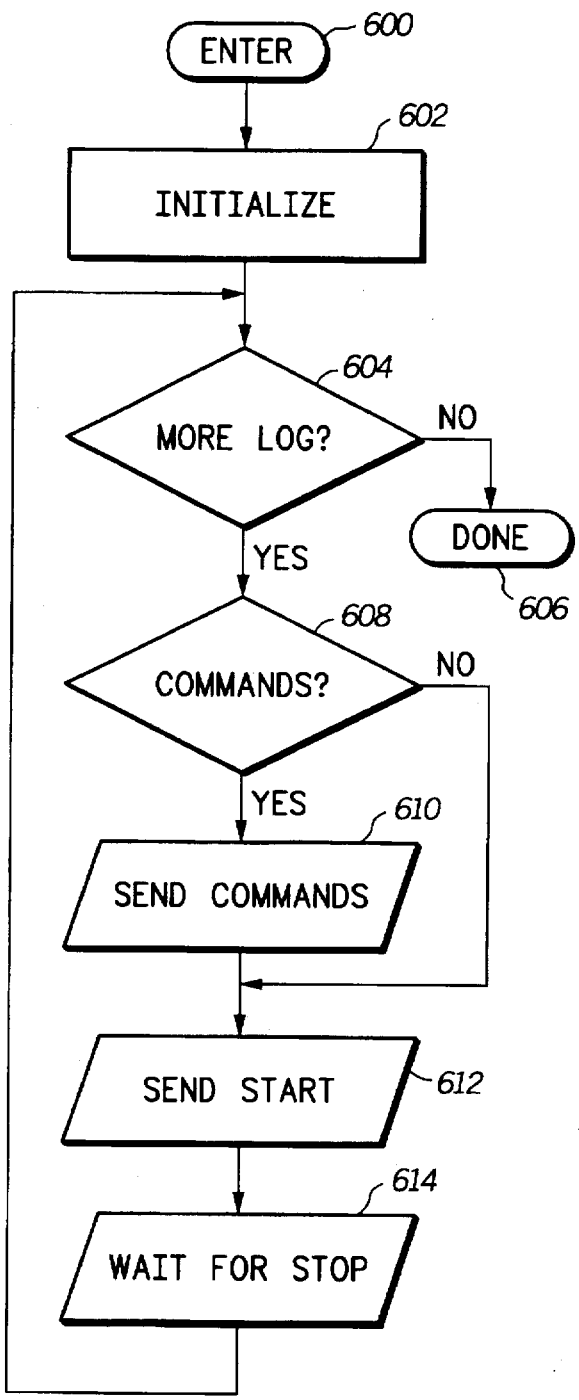
FIG. 19 is a flow chart showing in accordance with the present invention the operation of the MCUdebug restart facility.

FIG. 19 is a flow chart showing the operation of the MCUdebug restart facility. It will be remembered that the MCUdebug user has the capability of recording all debug commands issued in a script or log file. Screen commands, such as inline modification of memory, are translated into and recorded as command line type debug commands.

The restart facility starts, step 600, and initializes, step 602. The initialization, step 602, includes loading the Target MCU program into the Target MCU memory 48, 62, setting the Target MCU 58 program counter ("pc") to the appropriate start location, initializing variables, clearing the remainder of the Target MCU memory 48, 62, loading symbol tables into the Host Memory 24, opening source code files, displaying the text around the start location in the symbolic listing of the Target MCU program, and highlighting the start location in the symbolic listing window. This results in the application initialized to begin at a known initial state.

After initialization, step 602, the restart facility checks the script or log file for more log entries, step 604. If no more log entries are found, step 604, the restart facility exits, step 606, leaving the Target MCU in the state it was in at the time the log was closed or restart entry was inserted in the script or log file. Otherwise, a check is made for commands in the script or log file, step 608. If there are commands to issue in the script or log file, they are sent by the Host computer 20 to the MDS 40 for execution, step 610. In any case, a Start command for the Target MCU 58 is then sent by the Host computer 20 to the MDS 40, step 612. The restart facility in the Host computer 20 then waits until the Target MCU 58 again stops, step 614. Steps 604–614 are repeated until no more script or log entries are found, step 604.

One of the primary purposes for the MCUdebug system is to facilitate testing and debugging MCU configurations and programs before being embedded in Integrated Circuits (IC). The MCUdebug system significantly reduces circuit design turnaround. The manufacture of Integrated Circuits is extensively disclosed in the two volumes of "*Silicon Processing for the VLSI Era*" by Stanley Wolf, published by Lattice Press of Sunset Beach, Calif. Volume I subtitled "*Process Technology*" was copyrighted in 1986 by Lattice Press and has an ISBM of 0-961672-3-7. Volume II subtitled "*Process Integration*" was copyrighted in 1990 by Lattice Press and has an ISBM of 0-961672-4-5. Both volumes are incorporated herein by reference for the purpose of teaching the manufacture of Integrated Circuits.

Those skilled in the art will recognize that modifications and variations can be made without departing from the spirit of the invention. Therefore, it is intended that this invention encompass all such variations and modifications as fail within the scope of the appended claims.

Appendix
-1-

```
***************************************************************
* Equates for MC68HC05P9 MCU Paced Loop Example Program        *
*                                                              *
* Bit names are labled with <port name><bit number> (ex.       *
* PA7 equates to the seventh bit of port A.  Bit names         *
* are used in the commands that operate on individual          *
* bits, such as BSET and BCLR.                                 *
*                                                              *
* A bit name followed by a dot indicates a label that          *
* will be used to form a bit mask.                             *
*                                                              *
* This equates file contains only a subset of the HC05P9       *
* memory map--primarily those used by this paced loop          *
* example program.  To include the other ports and             *
* registers of the P9, please consult the MC68HC05P9           *
* Technical Data reference manual.                             *
***************************************************************

$BASE   10T
        PORTA   EQU   $00          ;I/O PORT A
        PA7     EQU   7            ;BIT#7 OF PORT A
        PA6     EQU   6
        PA5     EQU   5
        PA4     EQU   4
        PA3     EQU   3
        PA2     EQU   2
        PA1     EQU   1
        PA0     EQU   0
        PA7.    EQU   $80          ;BIT POSITION PA7
        PA6.    EQU   $40
        PA5.    EQU   $20
        PA4.    EQU   $10
        PA3.    EQU   $08
        PA2.    EQU   $04
        PA1.    EQU   $02
        PA0.    EQU   $01

DDRA    EQU   $04          ;PORT A DATA DIRECTION REGISTER
        DDRA7   EQU   7            ;BIT #7 OF PORT A DDR
        DDRA6   EQU   6
        DDRA5   EQU   5
        DDRA4   EQU   4
        DDRA3   EQU   3
        DDRA2   EQU   2
```

Appendix
-2-

```
     DDRA1    EQU   1
     DDRA0    EQU   0
     DDRA7.   EQU   $80      ;BIT POSITION OF DDRA7
     DDRA6    EQU   $40
5    DDRA5.   EQU   $20
     DDRA4.   EQU   $10
     DDRA3.   EQU   $08
     DDRA2.   EQU   $04
     DDRA1.   EQU   $02
10   DDRA0.   EQU   $01

TCR      EQU   $12      ;TIMER CONTROL REGISTER
     ICIE     EQU   7        ;INPUT CAPTURE INTERRUPT ENABLE BIT
     OCIE     EQU   6        ;OUTPUT COMPARE INTERRUPT ENABLE BIT
15   TOIE                    ;TIMER OVERFLOW INTERRUPT ENABLE BIT
     ICIE.    EQU   $80      ;INPUT CAPTURE INTERRUPT BIT POSITION
     OCIE.    EQU   $40      ;OUTPUT COMPARE INTERRUPT BIT POSITION
     TOIE.    EQU   $20      ;TIMER OVERFLOW INTERRUPT BIT POSITION

20   TSR      EQU   $13      ;TIMER STATUS REGISTER
     ICF      EQU   7        ;INPUT CAPTURE FLAG BIT
     OCF      EQU   6        ;OUTPUT COMPARE FLAG BIT
     TOF      EQU   5        ;TIMER OVERFLOW FLAG BIT
     ICF.     EQU   $80      ;INPUT CAPTURE FLAG BIT POSITION
25   OCF.     EQU   $40      ;OUTPUT COMPARE BIT POSITION
     TOF.     EQU   $20      ;TIMER BIT POSITION

OCRH     EQU   $16      ;OUTPUT COMPARE REGISTER(HIGH BYTE)
     OCRL     EQU   $17      ;OUTPUT COMPARE REG (LOW BYTE)
30   TCRH     EQU   $18      ;TIMER COUNTER REGISTER (HIGH BYTE)
     TCRL     EQU   $19      ;TIMER COUNTER REG (LOW BYTE)
     ACRH     EQU   $1A      ;ALTERNATE COUNTER REG (HIGH BYTE)
     ACRL     EQU   $1B      ;ALTERNATE COUNTER REG (LOW BYTE)

35   RAMStart EQU   $00C0    ;START OF ON-CHIP RAM
     ROMStart EQU   $0100    ;START OF ON-CHIP ROM
     ROMEnd   EQU   $08FF    ;END OF ON-CHIP ROM
     Vectors  EQU   $1FF8    ;RESET/INTERRUPT VECTOR AREA 40   ************************************************************
     * Application specific equates                              *
     ************************************************************

LED      EQU   PA7      ;LED ON WHEN PA7 IS LOW
```

Appendix
-3-

```
         LED.    EQU  PA7.       ;LED BIT POSITION

****************************************************************
         * Put program variables here (Use RMBs)                         *
         ****************************************************************

ORG  $00C0      ;START OF 705P9 RAM
         OCFs    RMB  1          ;3 OUTPUT COMPARE INTERRUPTS/TIC (3-0)
         TIC     RMB  1          ;10 TICS = 1 TOC (10-0) (MSB=1 INDICATES
                                 ;OCFs ROLLOVER)
         TOC     RMB  1          ;1 TOC=10 TICS (1 TIC = 3 OUTPUT COMPARE
                                 ;INTERRUPTS = 3 * 131.072ms OR 393.216ms)
                                 ;THUS 1 TOC = 10 * 393.216ms = 3.93216s)

****************************************************************
         * Program area starts here                                      *
         ****************************************************************

ORG  $0100      ;START OF 705P9 ROM
         START   CLRA            ;Clear the accumulator
                 STA  PORTA      ;TURN OFF LED
                 LDA  #led.      ;configure led
                 STA  DDRA       ;MAKE LED PIN AN OUTPUT
                 LDA  #OCIE.     ;ENABLE OUTPUT COMPARE INTERRUPTS
                 STA  TCR
                 BRCLR OCF,TSR,NEXT ;IF OCF IS NOT SET, SKIP INTERRUPT FLAG
         RESET
                 LDA  TSR        ;READ TIMER STATUS & OUTPUT COMPARE
         REGISTER
                 LDA  OCRL       ;TO CLEAR THE INTERRUPT
         NEXT    LDA  #3         ;OCFs COUNT 3-->0
                 STA  OCFs       ;SET OUTPUT COMPARE INTERRUPT COUNT
         TO 3
                 CLR  TIC        ;INITIALIZE VALUE FOR TIC
                 CLR  TOC        ;INITIALIZE VALUE FOR TOC
                 LDA  TCRH       ;READ HIGH BYTE OF TIMER COUNT
                 STA  OCRH       ;STORE COUNT INTO HIGH BYTE OF OCR
                 LDA  TCRL       ;READ LOW BYTE OF TCNT AND STORE TO OCR
                 STA  OCRL       ;SET OCR SO THAT INTERRUPT IS GENERATED
                                 ;ON THE NEXT OCCURENCE OF THE COUNT VALUE
                                 ;COPIED FROM THE TIMER COUNTER REGISTER.
                                 ;THIS COUNT WILL OCCUR AFTER ONE COMPLETE
                                 ;CYCLE OF THE COUNTER, THAT IS 262,144 CYCLES
                                 ;FOR A TOTAL OF 131.072ms OF TIME (2 MHz INT
```

Appendix
-4-

```
                ;OPERATING FREQUENCY)
            CLI    ;CLEAR I BIT IN STATUS REG TO ENABLE INTERRUPT

****************************************************************
 5  * MAIN - Beginning of main program loop.  Loop is              *
    * executed once every 400ms (393.216ms).  A pass through       *
    * all major task routinestakes less than 400mS and then        *
    * time is wasted until MSB of TIC is set (every 3 OCFs         *
    * interrupts= 393.216ms). At each OCF interrupt, the           *
10  * interrupt is serviced (OCFs gets decremented (3 ->0)         *
    * and then cleared by reading the TSR and low byte of          *
    * the Output Compare Register (OCRL).  When OCFs=0, MSB        *
    * of TIC gets set and OCFs is set back to 3.                   *
    * (3*131.072ms/OCF = 393.216ms)                                *
15  *                                                              *
    * The variable TIC keeps track of 400ms periods.  When         *
    * TIC increments from 9 to 10 it is cleared to 0 and TOC       *
    * is incremented (i.e.at 4 second intervals).                  *
    ****************************************************************
20
    MAIN    BRCLR  7,TIC,MAIN   ;LOOP HERE UNTIL TIC FLAG IS SET
            LDA    TIC          ;GET CURRENT TIC VALUE
            AND    #$0F         ;CLEARS MSB
            INCA                ;TIC=TIC+1
25          STA    TIC          ;UPDATE TIC
            CMP    #10          ;10TH TIC?
            BNE    ARNC1        ;IF NOT, SKIP NEXT CLEAR
            CLR    TIC          ;CLEAR TIC ON 10TH
    ARNC1   EQU    *
30
    * End of synchronization to 400ms TIC; Run main tasks &        *
    * branch back to main within 400ms.                            *

35          JSR    TIME         ;UPDATE TOCS

JSR    BLINK        ;BLINK LED

* Other main tasks may be inserted here.
40
            BRA    MAIN         ;BACK TO MAIN LOOP FOR NEXT TIC

* END of Main Loop  **************************************
```

Appendix
-5-

```
*****************************************************************
     * TIME - Update TOCs (Update occurs following TIC roll-        *
     * over from 10 to 0)                                           *
     * If TIC=0, increment 0->59                                    *
 5   * Else, just skip the whole routine                            *
     *****************************************************************

TIME    EQU    *
             TST    TIC              ;UPDATE TOCS
10           BNE    XTIME            ;IF TIC<>0, JUST EXIT
             INC    TOC              ;TOC=TOC+1
             LDA    #60
             CMP    TOC              ;TOC=60?
             BNE    XTIME            ;IF NOT, JUST EXIT
15           CLR    TOC              ;TOCs ROLLOVER
     XTIME   RTS                     ;RETURN FROM TIME

*****************************************************************
     * BLINK - Update LED                                           *
20   * If TOC is even, light LED                                    *
     * Else turn LED off                                            *
     *****************************************************************

BLINK   EQU    *
25           LDA    TOC              ;IF EVEN, LSB WILL BE ZERO
             LSRA                    ;SHIFT LSB TO CARRY
             BCS    LEDOFF           ;IF NOT, TURN LED OFF
             BSET   LED,PORTA        ;TURN ON LED
             BRA    XBLINK           ;THEN EXIT
30   LEDOFF  BCLR   LED,PORTA        ;TURN OFF LED
     XBLINK  RTS

*****************************************************************
     * OCF Interrupt Service Routine                                *
35   *****************************************************************

OCFCNT  DEC    OCFs             ;ON EACH OCF, DECREMENT OCFs
             BNE    ENDRTI           ;DONE IF OCFs NOT ZERO
             LDA    #3               ;OCFs COUNTS 3->0
40           STA    OCFs             ;RESET OCFs COUNT
             BSET   7,TIC            ;SET MSB AS A FLAG TO MAIN
     ENDRTI  LDA    TSR              ;CLEAR OCF INTERRUPT
             LDA    OCRL
     AnRTI   RTI                     ;RETURN FROM OCF INTERRUPT
```

Appendix
-6-

```
         UNUSED EQU   AnRTI        ;USE RTI AT AnRTI FOR UNUSED
                                   ;INTERRUPTS TO JUST RETURN
     ****************************************************************
5    * Interrupt & reset vectors                                     *
     ****************************************************************
               ORG   $1FF8         ;START OF VECTOR AREA TIMEVEC FDB  OCFCNT       ;COUNT OCFs 3/TIC
10       IRQVEC  FDB               ;CHANGE IF VECTOR USED
         SWIVEC  FDB  UNUSED       ;CHANGE IF VECTOR USED
         RESETV  FDB  START        ;BEGINNING OF PROGRAM ON RESET
```

We claim:

1. A method for synchronizing data in a Target Memory with a copy of that data located in a Host Memory on a Host Computer, wherein:

> data is organized in the Target Memory in a plurality of Target Data Lines,
>
> each one of the plurality of Target Data Lines comprises a corresponding fixed number of bits,
>
> each one of the plurality of Target Data Lines is uniquely identified by a corresponding Target means for identification,
>
> each of the plurality of Target Data Lines has a corresponding Target Line Dirty Flag,
>
> data is organized in the Host Memory in a plurality of Host Data Lines,
>
> each one of the plurality of Host Data Lines comprises a corresponding fixed number of bits,
>
> each one of the plurality of Host Data Lines is uniquely identified by a corresponding host means for identification,
>
> each of the plurality of Host Data Lines has a corresponding Host Line Dirty Flag,
>
> each of the plurality of Host Data Lines corresponds to a different one of the plurality of Target Data Lines, said method comprising the steps of:

a) determining whenever one or more bits in one of the plurality of Target Data Lines has been modified, wherein:

> the Target Data Line determined to have been modified is a Modified Target Data Line;

b) whenever the Station Controller determines in step (a) that one or more bits of the Target Data Line have been modified, determining whether the corresponding Target Line Dirty Flag is set;

c) whenever the Station Controller determines in step (a) that one or more bits in the Modified Target Data Line have been modified and that the corresponding Target Line Dirty Flag is determined in step (b) not to be set, the following substeps are performed:

> 1) sending a First Message from the Station Controller to the Host Computer comprising an indication that the Modified Target Data Line has been modified, and
>
> 2) setting the Target Line Dirty Flag corresponding to the Modified Target Data Line;

d) whenever a First Message sent in step (c) is received by the Host Computer, setting a Host Line Dirty Flag corresponding to the Modified Target Data Line;

e) sending a Second Message from the Host Computer to the Station Controller indicating the identity of a Host Data Line that has its corresponding Host Line Dirty Flag set;

f) sending a Third Message from the Station Controller to the Host Computer in response to the Second Message received in step (f), wherein said Third Message comprises:

> an ordered sequence of bits corresponding to the bits in the Host Data Line requested in the Second Message, and
>
> means for identifying the Host Data Line that corresponds to the ordered sequence of bits in the Third Message;

g) clearing the Target Line Dirty Flag corresponding to the Target Data Line corresponding to the Host Data Line identified by the Third Message sent in step (f);

h) when the Third Message is received by the Host Computer, updating the Host Data Line identified by the Third Message with the ordered sequence of bits in the Third Message; and i) when the Third Message is received by the Host Computer, clearing the Host Line Dirty Flag corresponding to the Host Data Line identified by the Third Message.

2. The method in claim 1 wherein each of the corresponding fixed number of bits is an integer multiple of sixty-four (64).

3. The method in claim 1 wherein:

> the Target Memory is a dual ported memory shared between the Station Controller and a Target Computer.

4. The method in claim 3 wherein within step (a):

> the Station Controller determines whether one or more bits in the plurality of Target Data Lines has been modified by comparing the Target Memory with a Secondary Copy of the Target Memory.

5. The method in claim 3 wherein within step (a):

> the Station Controller determines whether one or more bits in the plurality of Target Data Lines has been modified by computing a checksum for each of the Target Data Lines and comparing each of the checksums with one or more saved checksums of each of the Target Data Lines saved from a prior checksum computation.

6. The method in claim 1 wherein the First Message, the Second Message, and the Third Message are communicated between the Host computer and the Station Controller over an RS-232 connection.

7. The method in claim 1 wherein the Host Computer delays sending the Second Message for a specified Host Data Line until:

> the Host Line Dirty Flag for the Host Data Line is set, and the Host Data Line is in a Visible Memory.

8. A method for real time modification of Target Memory by a Host Computer Debugger executing on a Host Computer with a Host Memory, wherein:

> data is organized in the Target Memory in a plurality of Target Data Lines,
>
> each one of the plurality of Target Data Lines comprises a corresponding fixed number of bits,
>
> each one of the plurality of Target Data Lines is uniquely identified by a corresponding Target means for identification,
>
> each of the plurality of Target Data Lines has a corresponding Target Line Dirty Flag,
>
> data is organized in the Host Memory in a plurality of Host Data Lines,
>
> each one of the plurality of Host Data Lines comprises a corresponding fixed number of bits,
>
> each one of the plurality of Host Data Lines is uniquely identified by a corresponding host means for identification,
>
> each of the plurality of Host Data Lines has a corresponding Host Line Dirty Flag,
>
> each of the plurality of Host Data Lines corresponds to a different one of the plurality of Target Data Lines, said method comprising the steps of:

a) determining whenever one or more bits in one of the plurality of Target Data Lines has been modified, wherein:

> the Target Data Line determined to have been modified is a Modified Target Data Line;

b) whenever the Station Controller determines in step (a) that one or more bits of the Target Data Line have been modified, determining whether the corresponding Target Line Dirty Flag is set;

c) whenever the Station Controller determines in step (a) that one or more bits in the Modified Target Data Line have been modified and that the corresponding Target Line Dirty Flag is determined in step (b) not to be set, the following substeps are performed:

1) sending a First Message from the Station Controller to the Host Computer comprising an indication that the Modified Target Data Line has been modified, and 2) setting the Target Line Dirty Flag corresponding to the Modified Target Data Line;

d) whenever a First Message sent in step (c) is received by the Host Computer, setting a Host Line Dirty Flag corresponding to the Modified Target Data Line;

e) sending a Second Message from the Host Computer to the Station Controller indicating the identity of a Host Data Line that has its corresponding Host Line Dirty Flag set, wherein:

the identity of the Host Data Line in the Second Message corresponds to the Modified Target Data Line;

f) sending a Third Message from the Station Controller to the Host Computer in response to the Second Message received in step (f), wherein said Third Message comprises:

an ordered sequence of bits corresponding to the bits in the Host Data Line requested in the Second Message, and means for identifying the Host Data Line that corresponds to the ordered sequence of bits in the Third Message;

g) clearing the Target Line Dirty Flag corresponding to the Target Data Line corresponding to the Host Data Line identified by the Third Message sent in step (f);

h) when the Third Message is received by the Host Computer, updating the Host Data Line identified by the Third Message with the ordered sequence of bits in the Third Message;

i) when the Third Message is received by the Host Computer, clearing the Host Line Dirty Flag corresponding to the Host Data Line identified by the Third Message;

j) sending a Fourth Message from the Host Computer to the Station Controller that comprises:

means for specifying which bits in the Target Memory are to be modified, and one or more Replacement Data Bits to replace the corresponding bits in the Target Memory; and k) when the Fourth Message has been received by the Station Controller, replacing the bits of Target Memory specified in the Fourth Message with the Replacement Data Bits in the Fourth Message.

9. The method in claim 8 which further comprises the step of:

1) when the Third Message has been received by the Host Computer, updating a display of the Target Memory in the Host Computer Debugger with corresponding bits from the ordered sequence of bits from the Third Message.

10. A method for synchronizing data in a Target Memory with a copy of that data located in a Host Memory on a Host Computer, wherein:

data is organized in the Target Memory in a plurality of Target Data Lines, the Target Memory is a dual ported memory shared between the Station Controller and a Target Computer, each one of the plurality of Target Data Lines comprises a corresponding fixed number of bits, each one of the plurality of Target Data Lines is uniquely identified by a corresponding Target means for identification, each of the plurality of Target Data Lines has a corresponding Target Line Dirty Flag, data is organized in the Host Memory in a plurality of Host Data Lines, each one of the plurality of Host Data Lines comprises a corresponding fixed number of bits, each one of the plurality of Host Data Lines is uniquely identified by a corresponding host means for identification, each of the plurality of Host Data Lines has a corresponding Host Line Dirty Flag, each of the plurality of Host Data Lines corresponds to a different one of the plurality of Target Data Lines, said method comprising the steps of:

a) determining whenever one or more bits in one of the plurality of Target Data Lines has been modified, wherein:

the Target Data Line determined to have been modified is a Modified Target Data Line, and the Station Controller determines whether one or more bits in the plurality of Target Data Lines has been modified by comparing the Target Memory with a Secondary Copy of the Target Memory;

b) whenever the Station Controller determines in step (a) that one or more bits of the Target Data Line have been modified, determining whether the corresponding Target Line Dirty Flag is set;

c) whenever the Station Controller determines in step (a) that one or more bits in the Modified Target Data Line have been modified and that the corresponding Target Line Dirty Flag is determined in step (b) not to be set, the following substeps are performed:

1) sending a First Message from the Station Controller to the Host Computer comprising an indication that the Modified Target Data Line has been modified, and 2) setting the Target Line Dirty Flag corresponding to the Modified Target Data Line;

d) whenever a First Message sent in step (c) is received by the Host Computer, setting a Host Line Dirty Flag corresponding to the Modified Target Data Line;

e) sending a Second Message from the Host Computer to the Station Controller indicating the identity of a Host Data Line that has its corresponding Host Line Dirty Flag set;

f) sending a Third Message from the Station Controller to the Host Computer in response to the Second Message received in step (f), wherein said Third Message comprises:

an ordered sequence of bits corresponding to the bits in the Host Data Line requested in the Second Message, and means for identifying the Host Data Line that corresponds to the ordered sequence of bits in the Third Message;

g) clearing the Target Line Dirty Flag corresponding to the Target Data Line corresponding to the Host Data Line identified by the Third Message sent in step (f);

h) when the Third Message is received by the Host Computer, updating the Host Data Line identified by the Third Message with the ordered sequence of bits in the Third Message; and i) when the Third Message is received by the Host Computer, clearing the Host Line Dirty Flag corresponding to the Host Data Line identified by the Third Message.

11. An apparatus for synchronizing data in a Target Memory with a copy of that data located in a Host Memory on a Host Computer, wherein:

data is organized in the Target Memory in a plurality of Target Data Lines, each one of the plurality of Target Data Lines comprises a corresponding fixed number of bits, each one of the plurality of Target Data Lines is uniquely identified by a corresponding Target means for identification, each of the plurality of Target Data Lines has a corresponding Target Line Dirty Flag, data is organized in the Host Memory in a plurality of Host Data Lines, each one of the plurality of Host Data Lines comprises a corresponding fixed number of bits, each one of the plurality of Host Data Lines is uniquely identified by a corresponding host means for identification, each of the plurality of Host Data Lines has a corresponding Host Line Dirty Flag, each of the plurality of Host Data Lines corresponds to a different one of the plurality of Target Data Lines, said apparatus comprising of:

a) means for determining whenever one or more bits in one of the plurality of Target Data Lines has been modified, wherein:

the Target Data Line determined to have been modified is a Modified Target Data Line;

b) means for determining whether the corresponding Target Line Dirty Flag is set whenever element (a) determines that one or more bits in the Modified Target Data Line have been modified;

c) means for invoking the following subelements whenever element (a) determines that one or more bits in the Modified Target Data Line have been modified and, element (b) determines that the corresponding Target Line Dirty Flag is not set:

1) means for sending a First Message from the Station Controller to the Host Computer comprising an indication that the Modified Target Data Line has been modified, and 2) means for setting the Target Line Dirty Flag corresponding to the Modified Target Data Line;

d) means for setting a Host Line Dirty Flag corresponding to the Modified Target Data Line in response to a receipt of the First Message received by the Host Computer;

e) means for sending a Second Message from the Host Computer to the Station Controller indicating the identity of a Host Data Line that has its corresponding Host Line Dirty Flag set;

f) means for sending a Third Message from the Station Controller to the Host Computer in response to the Second Message received in step (f), wherein said Third Message comprises:

an ordered sequence of bits corresponding to the bits in the Host Data Line requested in the Second Message, and means for identifying the Host Data Line that corresponds to the ordered sequence of bits in the Third Message;

g) means for clearing the Target Line Dirty Flag corresponding to the Target Data Line corresponding to the Host Data Line identified by the Third Message sent in step (f);

h) means for updating the Host Data Line identified by the Third Message with the ordered sequence of bits in the Third Message in response to a receipt of the Third Message by the Host Computer; and i) means for clearing the Host Line Dirty Flag corresponding to the Host Data Line identified by the Third Message in response to a receipt of the Third Message by the Host Computer.

12. The apparatus in claim 11 wherein each of the corresponding fixed number of bits is an integer multiple of sixty-four (64).

13. The apparatus in claim 11 wherein:

the Target Memory is a dual ported memory shared between the Station Controller and a Target Computer.

14. The apparatus in claim 13 wherein within element (a):

the means for determining whether one or more bits in the plurality of Target Data Lines has been modified compars the Target Memory with a Secondary Copy of the Target Memory.

15. The apparatus in claim 13 wherein within element (a):

the means for determining whether one or more bits in the plurality of Target Data Lines has been modified computes a checksum for each of the Target Data Lines and compares each of the checksums with one or more saved checksums of each of the Target Data Lines saved from a prior checksum computation.

16. The apparatus in claim 11 wherein the First Message, the Second Message, and the Third Message are communicated between the Host computer and the Station Controller over an RS-232 connection.

17. The apparatus in claim 11 wherein the Host Computer delays sending the Second Message for a specified Host Data Line until:

the Host Line Dirty Flag for the Host Data Line is set, and the Host Data Line is in a Visible Memory.

18. An apparatus for real time modification of Target Memory by a Host Computer Debugger executing on a Host Computer with a Host Memory, wherein:

data is organized in the Target Memory in a plurality of Target Data Lines, each one of the plurality of Target Data Lines comprises a corresponding fixed number of bits, each one of the plurality of Target Data Lines is uniquely identified by a corresponding Target means for identification, each of the plurality of Target Data Lines has a corresponding Target Line Dirty Flag, data is organized in the Host Memory in a plurality of Host Data Lines, each one of the plurality of Host Data Lines comprises a corresponding fixed number of bits, each one of the plurality of Host Data Lines is uniquely identified by a corresponding host means for identification, each of the plurality of Host Data Lines has a corresponding Host Line Dirty Flag, each of the plurality of Host Data Lines corresponds to a different one of the plurality of Target Data Lines, said apparatus comprising of:

a) means for determining whenever one or more bits in one of the plurality of Target Data Lines has been modified, wherein:

the Target Data Line determined to have been modified is a Modified Target Data Line;

b) means for determining whether the corresponding Target Line Dirty Flag is set whenever element (a) determines that one or more bits in the Modified Target Data Line have been modified;

c) means for invoking the following subelements whenever element (a) determines that one or more bits in the Modified Target Data Line have been modified and, element (b) determines that the corresponding Target Line Dirty Flag is not set:

1) means for sending a First Message from the Station Controller to the Host Computer comprising an indication that the Modified Target Data Line has been modified, and 2) means for setting the Target Line Dirty Flag corresponding to the Modified Target Data Line;

d) means for setting a Host Line Dirty Flag corresponding to the Modified Target Data Line in response to a receipt of the First Message received by the Host Computer;

e) means for sending a Second Message from the Host Computer to the Station Controller indicating the identity of a Host Data Line that has its corresponding Host Line Dirty Flag set, wherein:

the identity of the Host Data Line in the Second Message corresponds to the Modified Target Data Line;

f) means for sending a Third Message from the Station Controller to the Host Computer in response to the Second Message received in step (f), wherein said Third Message comprises:

an ordered sequence of bits corresponding to the bits in the Host Data Line requested in the Second Message, and means for identifying the Host Data Line that corresponds to the ordered sequence of bits in the Third Message;

g) means for clearing the Target Line Dirty Flag corresponding to the Target Data Line corresponding to the Host Data Line identified by the Third Message sent in step (f);

h) means for updating the Host Data Line identified by the Third Message with the ordered sequence of bits in the Third Message in response to a receipt of the Third Message by the Host Computer;

i) means for clearing the Host Line Dirty Flag corresponding to the Host Data Line identified by the Third Message in response to a receipt of the Third Message by the Host Computer;

j) means for sending a Fourth Message from the Host Computer to the Station Controller that comprises:

means for specifying which bits in the Target Memory are to be modified, and one or more Replacement Data Bits to replace the corresponding bits in the Target Memory; and k) means for replacing the bits of Target Memory specified in the Fourth Message with the Replacement Data Bits in the Fourth Message in response to the receipt of the Fourth Message by the Station Controller.

19. The apparatus in claim 18 which further comprises:

1) means for updating a display of the Target Memory in the Host Computer Debugger with corresponding bits from the ordered sequence of bits from the Third Message in response to the receipt of the Third Message by the Host Computer.

20. An apparatus for synchronizing data in a Target Memory with a copy of that data located in a Host Memory on a Host Computer, wherein:

data is organized in the Target Memory in a plurality of Target Data Lines, the Target Memory is a dual ported memory shared between the Station Controller and a Target Computer, each one of the plurality of Target Data Lines comprises a corresponding fixed number of bits, each one of the plurality of Target Data Lines is uniquely identified by a corresponding Target means for identification, each of the plurality of Target Data Lines has a corresponding Target Line Dirty Flag, data is organized in the Host Memory in a plurality of Host Data Lines, each one of the plurality of Host Data Lines comprises a corresponding fixed number of bits, each one of the plurality of Host Data Lines is uniquely identified by a corresponding host means for identification, each of the plurality of Host Data Lines has a corresponding Host Line Dirty Flag, each of the plurality of Host Data Lines corresponds to a different one of the plurality of Target Data Lines, said apparatus comprising:

a) means for determining whenever one or more bits in one of the plurality of Target Data Lines has been modified, wherein:

the Target Data Line determined to have been modified is a Modified Target Data Line, and Target Data Lines are determined to have been modified by by comparing the Target Memory with a Secondary Copy of the Target Memory;

b) means for determining whether the corresponding Target Line Dirty Flag is set whenever element (a) determines that one or more bits of the Target Data Line have been modified;

c) means for invoking the following elements whenever element (a) determines that one or more bits in the Modified Target Data Line have been modified and element (b) determines that the corresponding Target Line Dirty Flag are not to be set:

1) means for sending a First Message from the Station Controller to the Host Computer comprising an indication that the Modified Target Data Line has been modified, and 2) means for setting the Target Line Dirty Flag corresponding to the Modified Target Data Line;

d) whenever a First Message sent in step (c) is received by the Host Computer, means for setting a Host Line Dirty Flag corresponding to the Modified Target Data Line;

e) means for sending a Second Message from the Host Computer to the Station Controller indicating the identity of a Host Data Line that has its corresponding Host Line Dirty Flag set;

f) means for sending a Third Message from the Station Controller to the Host Computer in response to the Second Message received in step (f), wherein said Third Message comprises:

an ordered sequence of bits corresponding to the bits in the Host Data Line requested in the Second Message, and means for identifying the Host Data Line that corresponds to the ordered sequence of bits in the Third Message;

g) means for clearing the Target Line Dirty Flag corresponding to the Target Data Line corresponding to the Host Data Line identified by the Third Message sent in step (f);

h) means for updating the Host Data Line identified by the Third Message with the ordered sequence of bits in the Third Message when the Third Message is received by the Host Computer; and i) means for clearing the Host Line Dirty Flag corresponding to the Host Data Line identified by the Third Message when the Third Message is received by the Host Computer.

21. An apparatus for synchronizing data in a Target Memory with a copy of that data located in a Host Memory on a Host Computer, wherein:

data is organized in the Target Memory in a plurality of Target Data Lines, each one of the plurality of Target Data Lines comprises a corresponding fixed number of bits, each one of the plurality of Target Data Lines is uniquely identified by a corresponding Target means for identification, each of the plurality of Target Data Lines has a corresponding Target Line Dirty Flag, data is organized in the Host Memory in a plurality of Host Data Lines, each one of the plurality of Host Data Lines comprises a corresponding fixed number of bits, each one of the plurality of Host Data Lines is uniquely identified by a corresponding host means for identification, each of the plurality of Host Data Lines has a corresponding Host Line Dirty Flag, each of the plurality of Host Data Lines corresponds to a different one of the plurality of Target Data Lines, said apparatus comprising:

a) a Station Controller connected to the Memory programmed to determine whenever one or more bits in one of the plurality of Target Data Lines has been modified, wherein:

the Target Data Line determined to have been modified is a Modified Target Data Line;

b) the Station Controller programmed to determine whether the corresponding Target Line Dirty Flag is set whenever the Station Controller determines in element (a) that one or more bits of the Target Data Line have been modified;

c) the Station Controller programmed to activate the following elements whenever the Station Controller determines in element (a) that one or more bits in the Modified Target Data Line have been modified and that the corresponding Target Line Dirty Flag is determined in element (b) not to be set:

1) the Station Controller programmed to send a First Message to the Host Computer comprising an indication that the Modified Target Data Line has been modified, and 2) the Station Controller programmed to set the Target Line Dirty Flag corresponding to the Modified Target Data Line;

d) a Host Computer Processor programmed to set a Host Line Dirty Flag corresponding to the Modified Target Data Line whenever a First Message sent in step (c) is received by the Host Computer;

e) the Host Computer Processor programmed to send a Second Message to the Station Controller indicating the identity of a Host Data Line that has its corresponding Host Line Dirty Flag set;

f) the Station Controller programmed to send a Third Message to the Host Computer in response to the Second Message received wherein said Third Message comprises:

an ordered sequence of bits corresponding to the bits in the Host Data Line requested in the Second Message, and means for identifying the Host Data Line that corresponds to the ordered sequence of bits in the Third Message;

g) the Station Controller programmed to clear the Target Line Dirty Flag corresponding to the Target Data Line corresponding to the Host Data Line identified by the Third Message sent in step (f);

h) the Host Computer Processor programmed to update the Host Data Line identified by the Third Message with the ordered sequence of bits in the Third Message when the Third Message is received by the Host Computer; and i) the Host Computer Processor programmed to clear the Host Line Dirty Flag corresponding to the Host Data Line identified by the Third Message when the Third Message is received by the Host Computer.

* * * * *